US010063072B2

(12) United States Patent
Tanaka et al.

(10) Patent No.: US 10,063,072 B2
(45) Date of Patent: Aug. 28, 2018

(54) BATTERY MODULE AND ASSEMBLED BATTERY

(71) Applicant: HITACHI AUTOMOTIVE SYSTEMS, LTD., Hitachinaka-shi, Ibaraki (JP)

(72) Inventors: Akihide Tanaka, Tokyo (JP); Yohshin Yagi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 156 days.

(21) Appl. No.: 15/032,883

(22) PCT Filed: Dec. 1, 2014

(86) PCT No.: PCT/JP2014/081732
§ 371 (c)(1),
(2) Date: Apr. 28, 2016

(87) PCT Pub. No.: WO2015/080285
PCT Pub. Date: Jun. 4, 2015

(65) Prior Publication Data
US 2016/0254687 A1 Sep. 1, 2016

(30) Foreign Application Priority Data
Nov. 29, 2013 (JP) ................................. 2013-248513

(51) Int. Cl.
*H02J 7/00* (2006.01)
*H01M 4/587* (2010.01)
(Continued)

(52) U.S. Cl.
CPC ......... *H02J 7/0026* (2013.01); *B60L 11/1803* (2013.01); *B60L 11/1861* (2013.01);
(Continued)

(58) Field of Classification Search
USPC ....................................................... 320/132
See application file for complete search history.

(56) References Cited

U.S. PATENT DOCUMENTS 6,023,151 A 2/2000 Hudson et al.
2010/0264929 A1 10/2010 Ugaji et al.
(Continued)

FOREIGN PATENT DOCUMENTS

JP 11-233155 A 8/1999
JP 2002-507826 A 3/2002
(Continued)

Primary Examiner — Samuel Berhanu
(74) Attorney, Agent, or Firm — Volpe and Koenig, P.C.

(57) ABSTRACT

A battery module includes a lithium ion secondary battery and a control circuit. The control circuit includes a measurement unit which measures voltage, current, and the time of charge/discharge of the lithium ion secondary battery; an operation unit which calculates a capacity based on the voltage, the current, and the time and calculates a differential value dQ/dV by differentiating the capacity with a voltage; a threshold voltage setting unit which specifies a peak of a low capacity side of the differential value dQ/dV generated on the basis of a stage structure of graphite and sets a voltage at the peak to a threshold voltage; a cutoff voltage setting unit which sets a discharge cutoff voltage of the lithium ion secondary battery on the basis of the threshold voltage; and a charge/discharge control unit which controls charge/discharge of the lithium ion secondary battery on the basis of the discharge cutoff voltage.

7 Claims, 10 Drawing Sheets

(51) Int. Cl.
*H01M 10/0525* (2010.01)
*H01M 10/42* (2006.01)
*H01M 10/44* (2006.01)
*H01M 10/48* (2006.01)
*H02J 7/04* (2006.01)
*H02J 7/14* (2006.01)
*B60L 11/18* (2006.01)
*H01M 4/38* (2006.01)
*H01M 4/62* (2006.01)
*H01M 10/46* (2006.01)
*H01M 4/02* (2006.01)

(52) U.S. Cl.
CPC ....... *B60L 11/1864* (2013.01); *B60L 11/1868* (2013.01); *B60L 11/1879* (2013.01); *H01M 4/386* (2013.01); *H01M 4/587* (2013.01); *H01M 4/625* (2013.01); *H01M 10/0525* (2013.01); *H01M 10/425* (2013.01); *H01M 10/44* (2013.01); *H01M 10/46* (2013.01); *H01M 10/48* (2013.01); *H02J 7/045* (2013.01); *H02J 7/1415* (2013.01); *H02J 7/1461* (2013.01); *H02J 7/1492* (2013.01); *B60L 2240/545* (2013.01); *B60L 2240/547* (2013.01); *B60L 2240/549* (2013.01); *H01M 2004/027* (2013.01); *H01M 2010/4271* (2013.01); *H01M 2220/20* (2013.01); *H02J 2007/004* (2013.01); *H02J 2007/0037* (2013.01); *Y02E 60/122* (2013.01); *Y02T 10/7011* (2013.01); *Y02T 10/7044* (2013.01); *Y02T 10/7061* (2013.01)

(56) References Cited

U.S. PATENT DOCUMENTS

| | | | | |
|---|---|---|---|---|
| 2011/0298424 | A1* | 12/2011 | Yamauchi | B60L 3/0046 320/118 |
| 2012/0105014 | A1* | 5/2012 | Nakayama | G01R 31/3624 320/162 |
| 2012/0169288 | A1* | 7/2012 | Ueki | B60L 11/1861 320/134 |
| 2013/0256592 | A1* | 10/2013 | Sano | H01M 4/5825 252/182.1 |

FOREIGN PATENT DOCUMENTS

| | | |
|---|---|---|
| JP | 2009-162750 A | 7/2009 |
| JP | 2012-169300 A | 9/2012 |
| JP | 5287872 B2 | 6/2013 |
| JP | 2013-196805 A | 9/2013 |

\* cited by examiner (a)

(b)

BATTERY MODULE AND ASSEMBLED BATTERY

TECHNICAL FIELD

The present invention relates to a battery module and a battery pack and particularly, to a battery module and a battery pack including a lithium ion secondary battery.

BACKGROUND ART

Because a lithium ion secondary battery has a high energy density, the lithium ion secondary battery attracts attention as a battery used for vehicle mounting such as a railroad and a vehicle or for storing power generated by photovoltaic power generation and wind power generation and supplying the power to a power system. As examples of the vehicle mounted with the lithium ion secondary battery (hereinafter, appropriately referred to as a "battery"), there are a zero-emission electric vehicle not mounted with an engine, a hybrid electric vehicle mounted with both the engine and a secondary battery, and a plug-in hybrid electric vehicle performing direct charging from a system power supply. In addition, the lithium ion secondary battery is expected as a stationary power storage system to supply power in an emergency situation where a power system is shut down.

For the various uses described above, a battery having a high capacity and a long life is required. For example, it is required that a decrease rate of a capacity of a rechargeable battery, that is, a decrease rate of a battery capacity is low and a maintenance rate of the battery capacity is high over a long period, even when an environment temperature increases or a charge/discharge cycle is repeated. In addition, a storage characteristic and a cycle life in an environment of a high temperature of 60° C. or more become important requirement performance, due to heat radiation from a road surface or heat conduction from the interior of the vehicle.

At the present time, in graphite generally used as a material of an electrode, a capacity reaches a capacity close to an approximate theoretical capacity and it is not anticipated that the capacity of the battery is further increased. For this reason, using a Si-based material as a material of an electrode is examined from the viewpoint of the capacity increase of the battery. However, it is known that Si has large expansion/contract according to charge/discharge and it is likely to cause cycle deterioration by repeating the charge/discharge.

In view of the above circumstances, PTL 1 discloses a non-aqueous secondary battery in which, when a sum of SiOx and graphite is set to 100 wt % in a negative electrode mixture layer, a ratio of SiOx is 2 to 30 wt % and first charge/discharge efficiency of a negative electrode is higher than first charge/discharge efficiency of a positive electrode.

In addition, PTL 2 discloses a life estimation method and a degradation control method for a lithium ion secondary battery in which a voltage at the time of an open circuit after discharge in the lithium ion secondary battery when charge/discharge is performed by a different cycle number is detected at least two times, according to the passage of a charge/discharge cycle. In PTL 2, at least two of individual detected voltage values are plotted for individual cycle numbers, a circular arc passing each plotted point is drawn, and a life of the lithium ion secondary battery is estimated on the basis of the magnitude of the circular arc. In PTL 2, advancement of degradation can be suppressed by controlling charge and discharge of the lithium ion secondary battery, on the basis of the estimated life.

In addition, PTL 3 discloses a discharge control method for a non-aqueous electrolyte secondary battery that is a method of discharging a non-aqueous electrolyte secondary battery using silicon oxide containing lithium as a negative electrode active material and executes control to discharge the non-aqueous electrolyte secondary battery in a range in which a negative electrode voltage for a lithium reference electrode does not exceed 0.6 V.

CITATION LIST

Patent Literature

PTL 1: Japanese Patent Application Laid-Open No. 2012-169300

PTL 2: Japanese Patent Application Laid-Open No. 2009-162750

PTL 3: Japanese Patent Application Laid-Open No. 11-233155

SUMMARY OF INVENTION

Technical Problem

As a result of having examined the cycle characteristic of the battery zealously, the present inventors have found that cycle deterioration is accelerated when degradation of the battery is advanced, in the lithium ion secondary battery including a silicon-based active material in a negative electrode mixture layer of a surface of a negative electrode. For this reason, as described in PTL 1, the degradation of the battery cannot be sufficiently suppressed only by defining an initial state of the battery. In addition, because the change of the voltage at the time of the open circuit after discharge in the lithium ion secondary battery described in PTL 2 is caused after advancement of the degradation of the battery in actuality, this is not sufficient as measures to increase the life of the battery. In addition, in the method described in PTL 3, because a third electrode is necessary in addition to the positive electrode and the negative electrode, the battery capacity decreases.

The present invention has been made in view of the above problems and an object of the present invention is to provide a battery module and a battery pack capable of improving a cycle characteristic of a lithium ion secondary battery.

Solution to Problem

In order to solve the above issue, a battery module of the present invention includes: a lithium ion secondary battery which has a negative electrode mixture layer including a silicon-based active material and graphite on a surface of a negative electrode; and a control circuit which controls charge/discharge of the lithium ion secondary battery, wherein the control circuit includes a measurement unit which measures a voltage, a current, and a time of the charge/discharge of the lithium ion secondary battery, an operation unit which calculates a capacity Q of the lithium ion secondary battery on the basis of the voltage, the current, and the time and calculates a differential value dQ/dV by differentiating the capacity Q with the voltage V, a threshold voltage setting unit which specifies a peak of a low capacity side of the differential value dQ/dV generated on the basis of a stage structure of the graphite and sets a voltage at the peak to a threshold voltage, a cutoff voltage setting unit which sets a discharge cutoff voltage of the lithium ion secondary battery on the basis of the threshold voltage, and a charge/discharge control unit which controls the charge/discharge of the lithium ion secondary battery on the basis of the discharge cutoff voltage.

Advantageous Effects of Invention

According to a battery module and a battery pack according to the present invention, a cycle characteristic of a lithium ion secondary battery can be improved by specifying a peak of a low capacity side generated in a differential value dQ/dV, setting a voltage at the peak to a threshold voltage, and setting a discharge cutoff voltage of the lithium ion secondary battery on the basis of the threshold voltage.

BRIEF DESCRIPTION OF DRAWINGS

FIG. 2(a) is a graph in which a horizontal axis shows a capacity Q and a vertical axis shows a differential value dQ/dV and FIG. 2(b) is a graph in which a horizontal axis shows a capacity Q and a vertical axis shows a voltage V.

DESCRIPTION OF EMBODIMENTS

Hereinafter, embodiments of a battery module and a battery pack according to the present invention will be described with reference to the drawings.

First Embodiment

Figure 1:
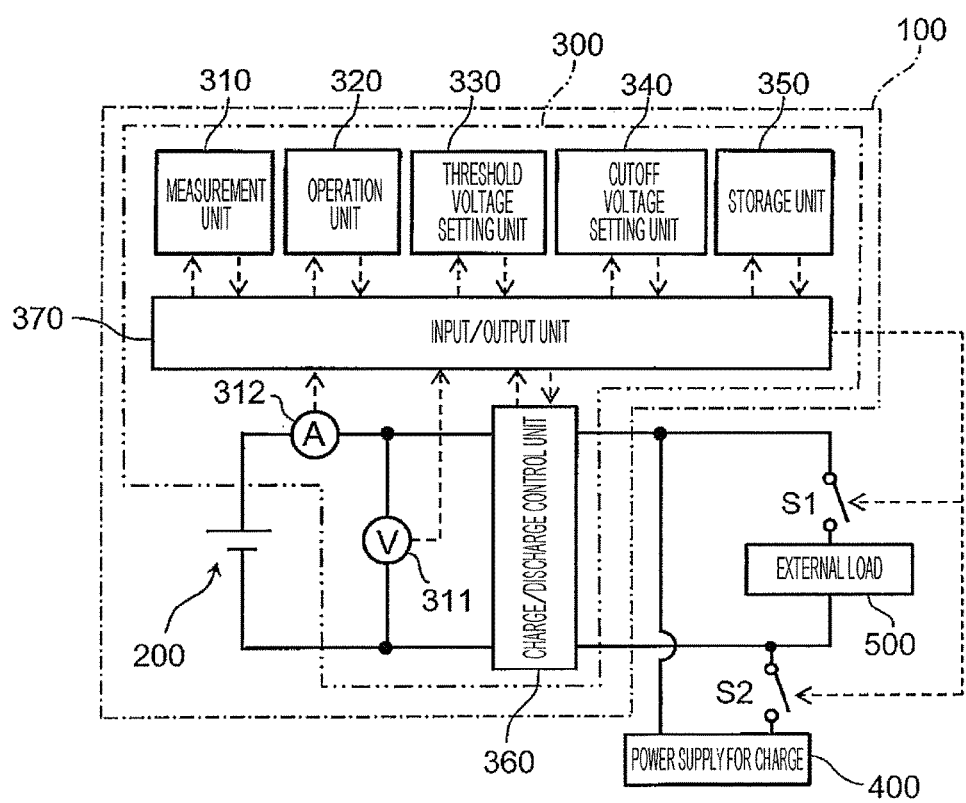
FIG. 1 is a circuit diagram illustrating a schematic configuration of a battery module according to a first embodiment of the present invention.

First, a first embodiment of the battery module according to the present invention will be described. FIG. 1 is a circuit diagram illustrating a schematic configuration of a battery module 100 according to this embodiment.

<Battery Module>

The battery module 100 includes a battery 200 that is a lithium ion secondary battery and a control circuit 300 that controls charge/discharge of the battery 200. Each of a positive electrode terminal and a negative electrode terminal of the battery 200 is connected to a power supply 400 for charge and an external load 500 via the control circuit 300 and switches S1 and S2.

(Control Circuit)

Next, the control circuit 300 included in the battery module 100 will be described in detail. The control circuit 300 includes a measurement unit 310, an operation unit 320, a threshold voltage setting unit 330, a cutoff voltage setting unit 340, a storage unit 350, and a charge/discharge control unit 360. These units are configured using a single computer unit or a plurality of computer units and are configured to exchange data with each other via an input/output unit 370 configured using a communication bus, for example.

The computer unit configuring each unit of the control circuit 300 is a controller, a computer system, or a microcomputer configured using a storage device or a CPU. A mechanism other than the computer unit that can input information, execute an operation, and output an operation result may be used. In addition, each unit of the control circuit 300 may be realized by an independent substrate and may be configured on the same device and realized as a microcomputer. In addition, a function of each unit of the control circuit 300 may be realized by the same computer unit.

The measurement unit 310 includes a voltage measurement element 311 and a current measurement element 312 that are connected to a positive electrode external terminal and a negative electrode external terminal of the battery 200. The measurement unit 310 measures a voltage and a current of charge/discharge of the battery 200, on the basis of signals input from the voltage measurement element 311 and the current measurement element 312 via the input/output unit 370. In addition, the measurement unit 310 measures a charge time, a discharge time, a stop time (standby time), and a non-use time of the battery 200. The voltage, the current, and the various time information of the battery 200 measured by the measurement unit 310 are input to the storage unit 350 via the input/output unit 370 and are held in the storage unit 350.

The operation unit 320 refers to the voltage, the current, and the various time information of the battery 200 held in the storage unit 350 via the input/output unit 370, executes an operation process such as integration, and holds an operation result in the storage unit 350 via the input/output unit 370. The operation unit 320 determines charge/discharge control parameters of the battery 200 such as the discharge or charge time, the discharge or charge voltage, and the discharge or charge current of the battery 200 and holds the charge/discharge control parameters in the storage unit 350 via the input/output unit 370.

In addition, the operation unit 320 refers to a voltage V, a current I, and a time t of the charge/discharge of the battery 200 stored in the storage unit 350 via the input/output unit 370 and calculates a capacity Q of the battery 200 on the basis of the voltage V, the current I, and the time t. Specifically, the operation unit 320 calculates a discharge capacity as the capacity Q by the product of the current I and the time t. In this embodiment, the charge capacity is used as the capacity Q. However, the discharge capacity can be used. In addition, the operation unit 320 calculates a differential value dQ/dV by differentiating the calculated capacity Q with a voltage V. The capacity Q and the differential value dQ/dV calculated by the operation unit 320 are input to the storage unit 350 via the input/output unit 370 and are stored in the storage unit 350.

Figure 2:
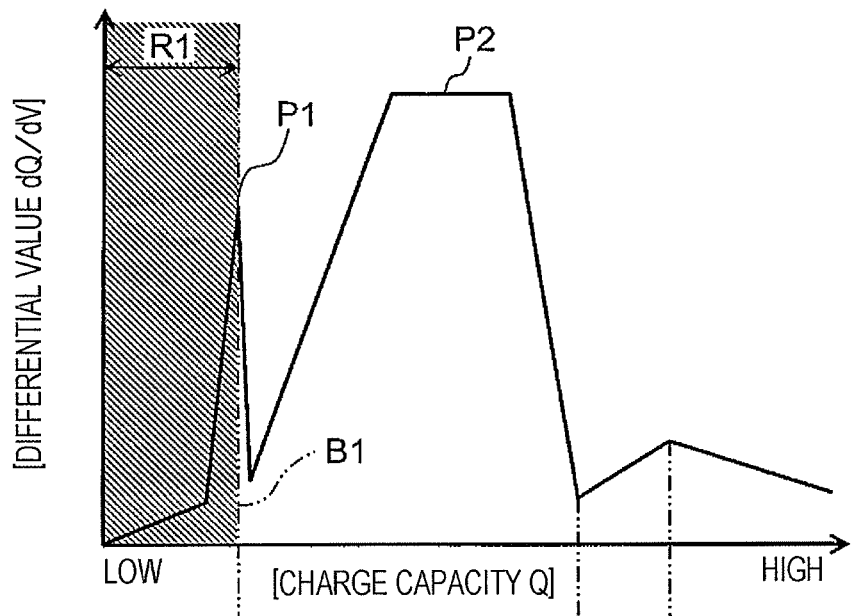
FIGS. 2(a) and 2(b) are graphs based on an operation result of an operation unit of the battery module illustrated in FIG. 1
Figure 2:
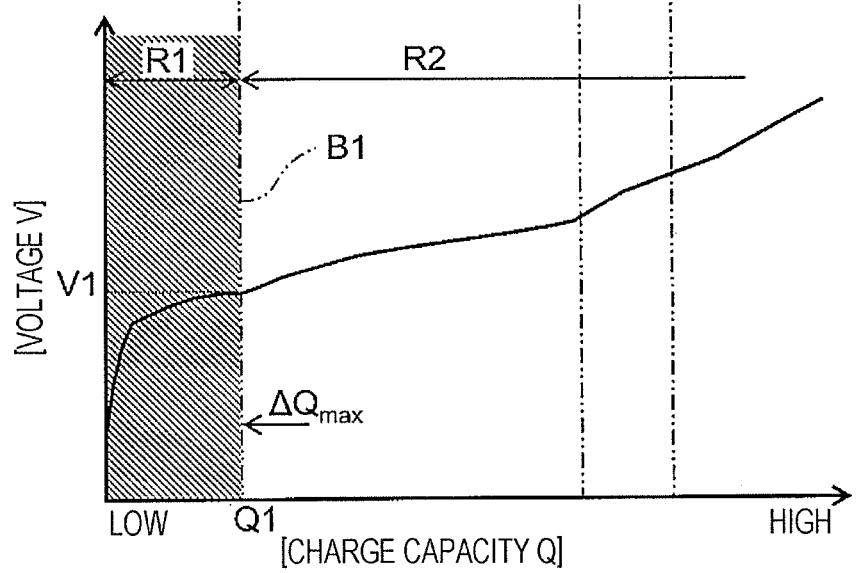

FIGS. 2(a) and 2(b) are graphs based on the operation result of the operation unit 320. FIG. 2(a) is a graph in which a horizontal axis shows a capacity Q and a vertical axis shows a differential value dQ/dV and FIG. 2(b) is a graph in which a horizontal axis shows a capacity Q and a vertical axis shows a voltage V.

The threshold voltage setting unit 330 refers to the capacity Q and the differential value dQ/dV held in the storage unit 350 via the input/output unit 370 and specifies an inflection point at a discharge side and a low capacity side to be generated in the differential value dQ/dV, that is, a peak P1, on the basis of the graph illustrated in FIG. 2(a). The peak P1 of the low capacity side is based on a stage structure of graphite included in a negative electrode mixture layer of a negative electrode of the battery 200. Movement for a third stage to a second stage of the graphite is generated in the vicinity of the peak P1, that is, a boundary B1 of a high capacity side shown by a two-dotted chain line in a hatched region R1 of a low capacity in the graph and a surrounding portion thereof.

At this time, the capacity Q changes relatively greatly with respect to a relatively small change of the voltage V, in the vicinity of the boundary B1 of the hatched region R1 of the discharge side of the low capacity, in a curve of the capacity Q and the voltage V illustrated in FIG. 2(b). As a result, as illustrated in FIG. 2(a), the peak P1 of the low capacity side is generated in the differential value dQ/dV, at the boundary B1 of the hatched region R1 of the low capacity. The threshold voltage setting unit 330 specifies the peak P1 and sets the voltage V1 at the peak P1 to a threshold voltage. A threshold voltage V1 set by the threshold voltage setting unit 330 is input to the storage unit 350 via the input/output unit 370 and is stored in the storage unit 350.

In addition, in the graph illustrated in FIG. 2(a), in the differential value dQ/dV, a peak P2 of the high capacity side based on the transition from the second stage to the first stage of the graphite is generated at the high capacity side closer to the charge side than the peak P1 of the low capacity side. Different from a vertex of the peak P1 of the low capacity side, in a vertex of the peak P2 of the high capacity side, a relatively flat portion is viewed. That is, the differential value dQ/dV has the relatively sharp peak P1 at the low capacity side and has the relatively moderate peak P2 at the high capacity side.

In an initial state, the cutoff voltage setting unit 340 sets a discharge cutoff voltage of the battery 200 to a predetermined voltage. At the time of control of the battery 200 based on the differential value dQ/dV to be described below, the cutoff voltage setting unit 340 refers to the threshold voltage V1 held in the storage unit 350 via the input/output unit 370 and sets a discharge cutoff voltage of the battery 200, on the basis of the threshold voltage V1. In this embodiment, the cutoff voltage setting unit 340 sets the discharge cutoff voltage of the battery 200 to the threshold voltage V1. The discharge cutoff voltage V1 set by the cutoff voltage setting unit 340 is input to the storage unit 350 via the input/output unit 370 and is held in the storage unit 350.

The charge/discharge control unit 360 is disposed between the battery 200 and the external load 500 and the power supply 400 for the charge. The charge/discharge control unit 360 closes the switch S1 of the external load 500 via the input/output unit 370, electrically connects the battery 200 and the external load 500, discharges the battery 200, and supplies power to the external load 500. The charge/discharge control unit 360 opens the switch S1 of the external load 500 via the input/output unit 370 and stops supplying of the power to the external load 500.

At the time of control of the battery 200 based on the differential value dQ/dV to be described below, the charge/discharge control unit 360 refers to the discharge cutoff voltage V1 held in the storage unit 350 via the input/output unit 370 and controls the charge/discharge of the battery 200, on the basis of the discharge cutoff voltage V1. At the time of discharging the battery 200, the charge/discharge control unit 360 refers to a measurement result of the measurement unit 310 via the input/output unit 370 and stops supplying of the power to the external load 500, when a voltage of the battery 200 decreases to the discharge cutoff voltage V1.

In addition, when the voltage of the battery 200 decreases to the discharge cutoff voltage V1, the charge/discharge control unit 360 closes the switch S2 of the power supply 400 for the charge via the input/output unit 370, electrically connects the battery 200 and the power supply 400 for the charge, and charges the battery 200. At the time of charging the battery 200, the charge/discharge control unit 360 refers to a measurement result of the measurement unit via the input/output unit 370 and opens the switch S2 of the power supply 400 for the charge via the input/output unit 370 and completes the charge of the battery 200, when the voltage of the battery 200 reaches the predetermined charge cutoff voltage. In addition, the charge/discharge control unit 360 refers to the charge/discharge control parameters held in the storage unit 350 via the input/output unit 370 and controls the charge/discharge of the battery 200, such that the voltage and the current of the battery 200 at the time of the charge/discharge enter a desired state.

The storage unit 350 is configured to hold data exchanged between the measurement unit 310, the operation unit 320, the threshold voltage setting unit 330, the cutoff voltage setting unit 340, and the charge/discharge control unit 360 via the input/output unit 370. A specific configuration of the storage unit 350 is not limited in particular. For example, a magnetic recording medium such as a floppy disk (FD) (registered trademark) and a hard disk drive (HDD) may be used as the storage unit 350. In addition, a semiconductor medium such as a random access memory (RAM) and a flash memory (USB memory) may be used as the storage unit 350. In addition, an optical recording medium such as a compact disk (such as CD-R and CD-RW), a digital versatile disk (such as DVD-R, DVD+R, DVD+RW, DVD-RW, and DVD-RAM), an HD-DVD, and a Blu-ray disk may be used as the storage unit 350.

The storage unit 350 may not be provided in the control circuit 300 and the measurement unit 310, the operation unit 320, the threshold voltage setting unit 330, the cutoff voltage setting unit 340, and the charge/discharge control unit 360 may exchange data with each other directly without using the storage unit 350.

Although not illustrated in the drawings, a temperature measurement unit such as a thermocouple and a thermistor may be provided to measure a temperature of the battery 200. In this case, preferably, the temperature measured by the temperature measurement unit is held in the storage unit 350 via the input/output unit 370 and temperature correction is performed in various operations by referring to the temperature of the battery 200 held in the storage unit 350 by the operation unit 310. As a result, the charge/discharge of the battery 200 can be optimally controlled according to the temperature and more accurate charge/discharge control can be executed.

(Lithium Ion Secondary Battery)

Figure 3:
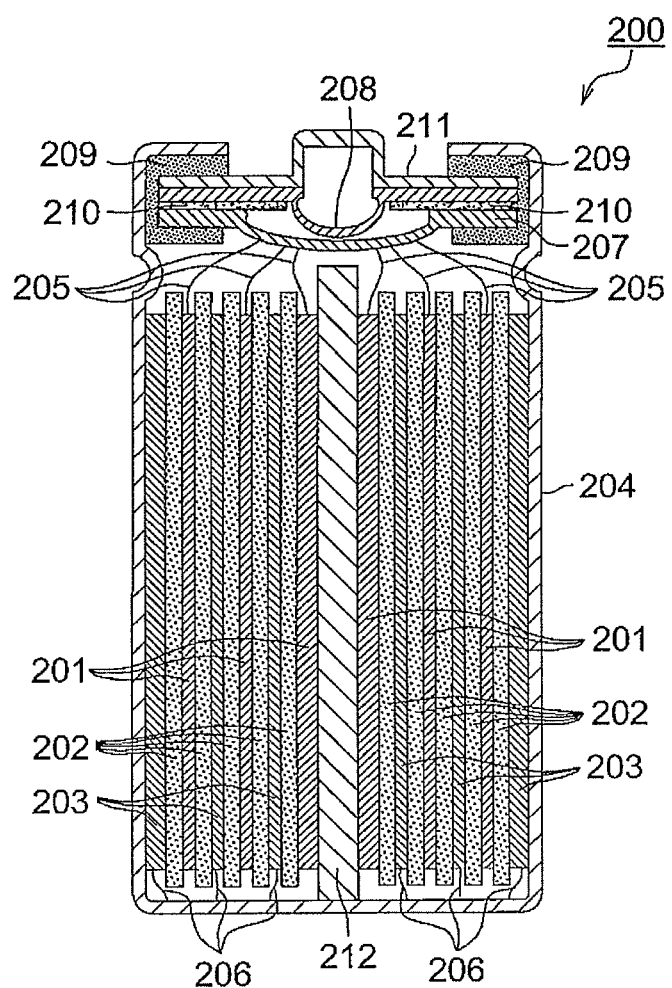
FIG. 3 is a cross-sectional view schematically illustrating an internal structure of a battery included in the battery module illustrated in FIG. 1.

Next, an example of a configuration of the battery 200 included in the battery module 100 according to this embodiment will be described in detail using FIG. 3. FIG. 3 is a cross-sectional view schematically illustrating an internal structure of the battery 200.

The battery 200 is a lithium ion secondary battery and includes a positive electrode 201, a separator 202, a negative electrode 203, a battery container, that is, a battery can 204, a positive electrode current collection tab 205, a negative electrode current collection tab 206, an inner lid 207, an internal pressure release valve 208, a gasket 209, a positive temperature coefficient (PTC) resistive element 210, a battery lid 211, and a shaft center 212. The battery lid 211 is an integrated component that includes the inner lid 207, the internal pressure release valve 208, the gasket 209, and the PTC resistive element 210. In addition, the positive electrode 201, the separator 202, and the negative electrode 203 are wound around the shaft center 212.

The positive electrode 201 is configured using a positive electrode active material, a conductive agent, a binder, and a current collector and includes a positive electrode mixture layer including the positive electrode active material, the conductive agent, and the binder on a surface of the current collector.

If the positive electrode active material is exemplified, $LiCoO_2$, $LiNiO_2$, and $LiMn_2O_4$ are representative examples. In addition, $LiMnO_3$, $LiMn_2O_3$, $LiMnO_2$, $Li_4Mn_5O_{12}$, $LiMn_{2-x}M_xO_2$ (however, M is at least one kind selected from the group consisting of Co, Ni, Fe, Cr, Zn, and Ti and x is 0.01 to 0.2), $Li_2Mn_3MO_8$ (however, M is at least one kind selected from the group consisting of Fe, Co, Ni, Cu, and Zn), $Li_{1-x}A_xMn_2O_4$ (however, A is at least one kind selected from the group consisting of Mg, B, Al, Fe, Co, Ni, Cr, Zn, and Ca and x is 0.01 to 0.1), $LiNi_{1-x}M_xO_2$ (however, M is at least one kind selected from the group consisting of Co, Fe, and Ga and x is 0.01 to 0.2), $LiFeO_2$, $Fe_2(SO_4)_3$, $LiCo_{1-x}M_xO_2$ (however, M is at least one kind selected from the group consisting of Ni, Fe, and Mn and x is 0.01 to 0.2), $LiNi1-xMxO_2$ (however, M is at least one kind selected from the group consisting of Mn, Fe, Co, Al, Ga, Ca, and Mg and x is 0.01 to 0.2), $Fe(MoO_4)_3$, $FeF_3$, $LiFePO_4$, and $LiMnPO_4$ can be enumerated.

The positive electrode active material preferably includes lithium composite oxide represented by the following formula (1), from the viewpoint of easily measuring a potential, particularly, $LiNi_{1/3}Mn_{1/3}Co_{1/3}O_2$.

$$LiNi_aMn_bCo_cM_dO_2 \quad (1)$$

In the formula (1), M shows at least one kind selected from the group consisting of Fe, V, Ti, Cu, Al, Sn, Zn, Mg, B, and W and a, b, c, and d are values satisfying $0.2 \le a \le 0.8$, $0.1 \le b \le 0.4$, $0 \le c \le 0.4$, and $0 \le d \le 0.1$, respectively, and are in a relation of $a+b+c+d=1$. In each exemplified material, characters such as "M" and "x" overlapped in each exemplified material are described. However, it is assumed that these characters are independent in each exemplified material. This is the same in the following description, as long as designation is not given in particular.

A grain size of the positive electrode active material is normally defined to a value equal to or smaller than a thickness of the mixture layer including the positive electrode active material, the conductive agent, and the binder. When coarse grains having a size equal to or larger than the thickness of the mixture layer exist in powders of the positive electrode active material, particles having a size equal to or smaller than the thickness of the mixture layer are preferably produced by removing the coarse grains by sieve classification and wind flow classification in advance. In addition, because the positive electrode active material is generally based on oxide, electrical resistance is high. For this reason, a conductive agent including carbon powders to supplement electrical conductivity is used. Because both the positive electrode active material and the conductive agent are normally powders, the positive electrode active material and the conductive agent can be adhered to the current collector at the same time as coupling the powders by mixing the powders with the binder.

In the current collector of the positive electrode 201, aluminum foil having a thickness of 10 to 100 μm, perforation foil made of aluminum and having a thickness of 10 to 100 μm and a hole diameter of 0.1 to 10 mm, an expanded metal, or a foam metal plate is used. In addition to aluminum, materials such as stainless and titanium are applicable. In this embodiment, any current collector can be used without putting limitation on a material, a shape, and a manufacturing method. After positive electrode slurry obtained by mixing the positive electrode active material, the conductive agent, the binder, and an organic solvent is applied to the current collector by a doctor blade method, a dipping method, or a spray method, the organic solvent is dried and is compressed and formed by a roll press machine, so that it is possible to manufacture the positive electrode 201 including the positive electrode mixture layer on the surface of the current collector. In addition, a process from the application to the drying is executed several times, so that a plurality of positive electrode mixture layers can be stacked on the current collector.

The negative electrode 203 is configured using a negative electrode active material, a binder, and a current collector and includes a negative electrode mixture layer including the negative electrode active material, the conductive agent, and the binder on a surface of the current collector. When charge/discharge of a high rate of the battery 200 is necessary, the conductive agent may be further added to the negative electrode mixture layer. The negative electrode active material includes silicon metals, an alloy thereof, materials forming an alloy with lithium of silicon lower oxide $Li_xSiO_y$ ($0 \le x$ and $0 < y < 2$), and materials forming intermetallic compounds, as silicon-based active materials.

When a sum of mass of the silicon-based active material and the graphite included in the negative electrode active material is set to 100 wt %, the negative electrode active material includes the silicon-based active material at a ratio of 2 wt % to 65 wt % and includes the graphite at a ratio of 35 wt % to 98 wt %. When the ratio of the silicon-based active material is less than 2 wt %, a capacity increase of the battery 200 by the capacity of the silicon-based active material is small and degradation of the battery 200 due to the silicon-based active material is small. For this reason, the influence of the temporary capacity decrease is easy to be actualized. When the ratio of the silicon-based active material is larger than 65 wt %, the peak P1 illustrated in FIG. 2(*a*) is unclear and malfunction is easy to occur in the battery module 100.

The ratio of the silicon-based active material included in the negative electrode active material is preferably 30 wt % or less, more preferably, 10 wt % or less. Thereby, a cycle capacity maintenance rate of the battery 200 can be improved and a balance of a discharge integration capacity at a cycle can be improved.

As the silicon-based active material, particularly, SiOx (silicon oxide) is preferably used. However, an atom ratio x of O to Si is $0.5 \leq x \leq 1.5$. In SiOx, cycle deterioration is small as compared with a silicon-based alloy and a superior cycle characteristic can be maximally shown in the battery 200. The SiOx preferably includes a crystal phase and an amorphous phase of Si. For example, a structure in which Si, for example, microcrystal Si is dispersed may be included in an amorphous $SiO_2$ matrix and the atom ratio x may satisfy $0.5 \leq x \leq 1.5$, including amorphous $SiO_2$ and Si dispersed therein.

In the graphite included in the negative electrode active material, a graphite interlayer distance ($d_{002}$) is preferably 0.335 nm to 0.338 nm. Because a potential curve of the graphite has a stage structure, the negative electrode mixture layer included in the negative electrode 203 includes the graphite, so that the cycle characteristic of the lithium ion secondary battery can be greatly improved. The graphite used for the negative electrode active material is manufactured using, as raw materials, natural graphite, artificial graphite, mesophase carbon, expanded graphite, carbon fibers, vapor-grown carbon fibers, pitch-based carbonaceous materials, needle coke, petroleum coke, and polyacrylonitrile-based carbon fibers, which are able to chemically store and discharge lithium ions. The graphite interlayer distance ($d_{002}$) can be measured with the use of an X-ray diffraction method (XRD) or the like.

A carbon particle of the silicon-based active material and the graphite raw material is preferably a coating particle that has a so-called core-shell structure in which a conductive coating layer is provided on a particle surface. As the coating layer, an amorphous carbon coating layer can be exemplified. A raw material of the amorphous carbon coating layer is not limited in particular. For example, an amorphous carbon material to be polycyclic aromatic hydrocarbon such as a phenol resin (novolac-type phenol resin), naphthalene, anthracene, and creosote oil can be used. When the coating layer is formed, an amorphous carbon material is diluted with an organic solvent, carbon particles are dispersed therein, and the amorphous carbon material is adhered to surfaces of the carbon particles. Next, the organic solvent is removed by filtering the carbon particle material to which the amorphous carbon material is adhered and drying the carbon particle material, heat treatment is performed, the coating layer made of the amorphous carbon material is formed on the surfaces of the carbon particles, and the coating carbon particles are formed. A heat treatment temperature is preferably in a range of 200° C. to 1000° C., more preferably, in a range of 500° C. to 800° C. A heat treatment time is preferably in a range of 1 to 50 hours.

In addition, the negative electrode active material may include a third active material appropriately. For example, metals such as non-graphite carbon, aluminum, and tin, an alloy thereof, materials forming an alloy with lithium of transition metal nitride $Li_{(3-x)}M_xN$ containing lithium and tin lower oxide $Li_xSnO_y$, and materials forming intermetallic compounds can be selected. The third negative electrode active material is not limited in particular. However, preferably, a characteristic potential change is not generated in the vicinity of the peak P1 illustrated in FIG. 2(a). When other peak exists in the vicinity of the peak P1, malfunction may be easy to occur in the battery module 100. The non-graphite carbon is a carbon material other than the graphite and can store and discharge lithium ions. This includes a carbon material having an interval of graphite layers equal to or larger than 0.34 nm and changed to the graphite by heat treatment of a high temperature of 2000° C. or more, cyclic hydrocarbon of a five-membered ring or a six-membered ring, and an amorphous carbon material obtained by synthesizing a cyclic organic compound containing oxygen by thermal decomposition.

Generally, because the negative electrode active material is powders, the negative electrode active material is applied and adhered to the current collector at the same time as coupling the powders by mixing the positive electrode active material with the binder. In the negative electrode 203 of the battery 200 according to this embodiment, a particle size of the negative electrode active material is preferably equal to or smaller than the thickness of the negative electrode mixture layer including the negative electrode active material and the binder. When coarse grains having a size equal to or larger than the thickness of the negative electrode mixture layer exist in the powders of the negative electrode active material, particles having a size equal to or smaller than the thickness of the negative electrode mixture layer are preferably used by removing the coarse grains by sieve classification and wind flow classification in advance.

The negative electrode mixture layer preferably adheres closely to the surface of the negative electrode current collector. The thickness of the negative electrode current collector is not limited in particular. However, the thickness of the negative electrode current collector is preferably in a range of 1 to 200 μm.

A material of the binder is not limited in particular. For example, styrene butadiene rubber (SBR), carboxymethyl cellulose, polyvinylidene fluoride (PVDF), and a mixture material or a composite material thereof can be used. A mixture material of styrene butadiene rubber and carboxymethyl cellulose is preferable.

As the current collector of the negative electrode 203, copper foil having a thickness of 10 to 100 μm, perforation foil made of copper and having a thickness of 10 to 100 μm and a hole diameter of 0.1 to 10 mm, an expanded metal, or a foam metal plate is used. In addition to copper, materials such as stainless, titanium, and nickel are applicable. In this embodiment, any current collector can be used without putting limitation on a material, a shape, and a manufacturing method.

After negative electrode slurry obtained by mixing the negative electrode active material, the binder, and an organic solvent is applied to the current collector by a doctor blade method, a dipping method, or a spray method, the organic solvent is dried and is compressed and formed by a roll press machine, so that it is possible to manufacture the negative electrode 203 including the negative electrode mixture layer on the surface of the current collector. In addition, a process from the application to the drying is executed several times, so that a plurality of mixture layers can be stacked on the surface of the current collector of the negative electrode 203.

The separator 202 is disposed between the positive electrode 201 and the negative electrode 203 manufactured by the above method to prevent a short circuit of the positive electrode 201 and the negative electrode 203. In the separator 202, a polyolefin-based polymer sheet including polyethylene and polypropylene or a two-layer structure obtained by welding a polyolefin-based polymer and a fluorine-based polymer sheet represented by polytetrafluoroethylene can be used. To prevent the separator 202 from being contracted when the battery temperature increases, a mixture of ceramic and a binder may be formed thinly on the surface of the separator 202. Because it is necessary to transmit lithium ions when the battery 200 is charged and discharged, the separator 202 can be used in the lithium ion secondary battery, generally as long as a pore size is 0.01 μm to 10 μm and porosity is 20% to 90%.

The separator 202 is disposed between the positive electrode 201 and the negative electrode 203 and an electrode group wound around the shaft center 212 is manufactured. As the shaft center 212, any known shaft center that can support the positive electrode 201, the separator 202, and the negative electrode 203 can be used. The electrode groups can be formed in various shapes other than a shape of a cylinder illustrated in FIG. 3, for example, strip-shaped electrodes can be stacked and the positive electrode 201 and the negative electrode 203 can be wound in any shape such as a flat shape.

As a shape of the battery container 204, shapes such as a cylindrical shape, a flat oblong shape, a flat elliptic shape, and a rectangular shape maybe selected according to the shape of the electrode group. A material of the battery container 204 is selected from materials having corrosion resistance to the non-aqueous electrolyte, such as aluminum, stainless steel, and nickel plated steel. In addition, when the battery container 204 is electrically connected to the positive electrode 201 or the negative electrode 203, the material of the battery container 204 is selected to prevent corrosion of the battery container 204 or alteration of a material by alloying with lithium ions, in a portion contacting the non-aqueous electrolyte.

The electrode group is stored in the battery container 204, the negative electrode current collection tab 206 is connected to an inner wall of the battery container 204, and the positive electrode current collection tab 205 is connected to a bottom surface of the battery lid 211. An electrolyte solution is injected into the battery container 204 before sealing the battery 200. As a method of injecting the electrolyte solution, there is a method of impregnating the electrode group with the electrolyte solution directly in a state in which the battery lid 211 is released or a method of injecting the electrolyte solution from an inlet located at the battery lid 211. Then, the battery lid 211 is closely adhered to the battery container 204 to seal the entire battery 200. When there is the inlet for the electrolyte solution, the inlet is also hermetically sealed. As a method of sealing the battery 200, known technology such as welding and swaging is used.

As a representative example of the electrolyte solution used in this embodiment, there is a solution obtained by dissolving lithium hexafluorophosphate ($LiPF_6$) or lithium borofluoride ($LiBF_4$) corresponding to an electrolyte in a solvent obtained by mixing ethylene carbonate with dimethyl carbonate, diethyl carbonate, and ethylmethyl carbonate. In this embodiment, other electrolyte solutions can be used without putting limitation on a type of the solvent or the electrolyte and a mixture ratio of the solvent.

Examples of the non-aqueous solvent used for the electrolyte solution include non-aqueous solvents such as propylene carbonate, ethylene carbonate, butylene carbonate, vinylene carbonate, γ-butyrolactone, dimethyl carbonate, diethyl carbonate, methylethyl carbonate, 1,2-dimethoxyethane, 2-methyltetrahydrofuran, dimethylsulfoxide, 1,3-dioxolan, formamide, dimethylformamide, methyl propionate, ethyl propionate, phosphate triester, trimethoxymethane, dioxolan, diethyl ether, sulfolane, 3-methyl-2-oxazolidinone, tetrahydrofuran, 1,2-diethoxyethane, chloroethylene carbonate, and chloropropylene carbonate. Solvents other than these solvents may be used as long as the solvents are not degraded on the positive electrode 201 or the negative electrode 203 incorporated into the battery 200 according to this embodiment.

Examples of the electrolyte include various lithium salts such as $LiPF_6$, $LiBF_4$, $LiClO_4$, $LiCF_3SO_3$, $LiCF_3CO_2$, $LiAsF_6$, $LiSbF_6$, and imide salts of lithium represented by lithium trifluoromethane sulfone imide. Non-aqueous electrolyte solutions obtained by dissolving the salts in the solvents described above can be used as electrolyte solutions for the battery. Electrolytes other than these electrolytes may be used as long as the electrolytes are not degraded on the positive electrode 201 or the negative electrode 203 incorporated into the battery 200 according to this embodiment. In the case of using a solid polymer electrolyte (polymer electrolyte) as the electrolyte, ion-conducting polymers such as polyethylene oxide, polyacrylonitrile, polyvinylidene fluoride, polymethylmethacrylate, polyhexafluoropropylene, and polyethylene oxide can be used for the electrolyte. In the case of using the solid polymer electrolytes, there is an advantage in that the separator 202 can be omitted. In addition, ionic liquids can be used as the electrolyte. For example, a combination not degraded on the positive electrode 201 or the negative electrode 203 can be selected from 1-ethyl-3-methylimidazolium tetrafluoroborate (EMI-$BF_4$), a mixed complex of a lithium salt $LiN(SO_2CF_3)_2$ (LiTFSI), Triglyme, and Tetraglyme, cyclic quaternary ammonium-based cations (exemplified by N-methyl-N-propylpyrrolidinium), and imide-based anions (exemplified by bis(fluorosulfonyl)imide) can be used for the battery 200 according to this embodiment.

Hereinafter, functions of the battery module 100 according to this embodiment including the battery 200 and the control circuit 300 will be described.

As a result of having performed an examination zealously, the present inventors have found that control of the discharge cutoff capacity is important for improvement of a cycle characteristic of the battery 200 including the negative electrode 203 having the negative electrode mixture layer including the negative electrode active material obtained by mixing the silicon-based active material and the graphite. That is, it has been found that degradation of the battery 200 using the negative electrode 203 including the silicon-based active material and the graphite in the negative electrode mixture layer increases when a discharge range of a constant capacity or less is used. As a result of having performed an examination zealously, the present inventors have found that a drive range of the negative electrode 203 including the negative electrode mixture layer including the silicon-based active material and the graphite is important as a factor of the degradation of the battery 200. That is, if the battery 200 is used cyclically at the discharge side of the negative electrode 203, that is, in the region R1 illustrated in FIGS. 2(a) and 2(b), the degradation of the battery 200 increases.

Figure 4:
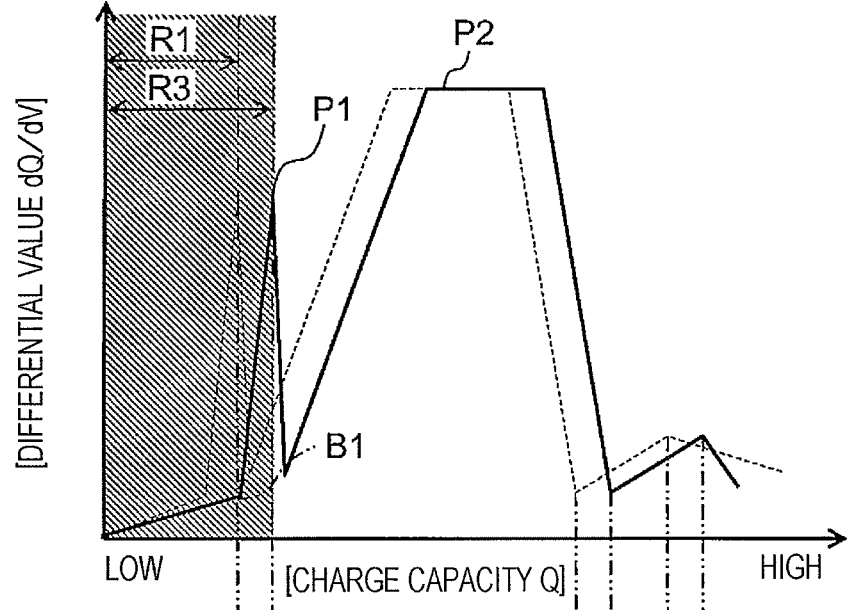
FIGS. 4(a) and 4(b) are graphs illustrating degradation of the battery illustrated in FIG. 1 and corresponding to FIGS. 2(a) and 2(b) and FIG. 4(a) is a graph in which a horizontal axis shows a capacity Q and a vertical axis shows a differential value dQ/dV and FIG. 4(b) is a graph in which a horizontal axis shows a capacity Q and a vertical axis shows a voltage V.
Figure 4:
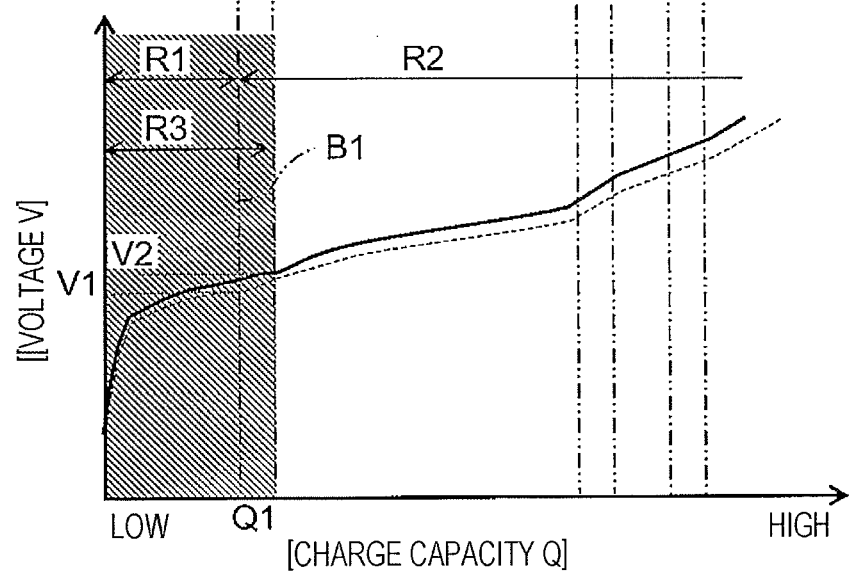

Meanwhile, the drive range of the negative electrode 203 moves to the discharge side when Li stored in the negative electrode 203 is deactivated and the battery 200 is degraded. As a result, a region of the discharge side of the negative electrode moves to the charge side of the battery. That is, when the battery 200 is degraded, a position of the peak P1 illustrated in FIGS. 2(a) and 2(b) moves to the side of a high voltage V2 and the high capacity side and the boundary B1 of a region R1 where the degradation is large is shifted to the high capacity side as illustrated in FIGS. 4(a) and 4(b). For this reason, even though the drive range of the battery 200 is set to use the region R2 of the high capacity side where the degradation is small as compared with the region R1 of the low capacity side, using the discharge cutoff voltage V1 or the discharge capacity Q, at the time of starting a use of the battery 200, as illustrated in FIG. 4(b), the drive range of the negative electrode is shifted to the high capacity side of the battery and a use of a region R3 where the degradation is large starts. For this reason, in the case in which the range of the discharge cutoff voltage V1 or the charge capacity Q used for the charge/discharge of the battery 200 is fixed, cycle deterioration is accelerated when the battery 200 is used.

A degree of a movement of the drive range of the negative electrode 203 to the discharge side greatly depends on a drive method of the battery 200, an environmental factor such as a leaving temperature, and a variation at the time of manufacturing. Furthermore, for the degree of the movement of the drive range of the negative electrode 203, the drive method of the battery 200 or the environmental factor such as the leaving temperature greatly depends on a use form of a user. For this reason, in the battery 200 manufactured under the same conditions, the degree of the movement of the drive range of the negative electrode 203 cannot be determined from an absolute value of the voltage of the battery 200 or a degradation rate of the battery 200.

As a result of having performed an examination zealously, the present inventors have found that it is possible to provide the battery module 100 capable of improving the cycle characteristic of the battery 200 by changing a charge/discharge condition of the battery 200 appropriately, when a predetermined condition is satisfied, on the basis of a capacity Q and an inflection point of the low capacity side of a differential value dQ/dV obtained by differentiating the capacity Q with a voltage V, that is, the peak P1 illustrated in FIGS. 2(a) and 4(a). In this embodiment, dQ/dV is used as the differential value. However, dV/dQ is used as the differential value. However, since the peak P1 in dV/dQ tends to become unclear slightly larger than the peak P1 in dQ/dV, the battery module 100 is easy to cause malfunction.

In addition, as a result of having performed an examination zealously, the present inventors have found that the cycle deterioration is large when the regions R1 and R3 closer to the discharge side than the inflection point, that is, the peak P1 illustrated in FIGS. 2(a) and 4(a) is driven cyclically in the lithium ion secondary battery using the negative electrode having the negative electrode mixture layer including the negative electrode active material in which the silicon-based active material and the graphite are mixed. In other words, if the battery 200 is used in a range closer to the discharge side than the peak P1, the battery module 100 capable of using the battery 200 with a high capacity and a long life can be provided.

Figure 5:
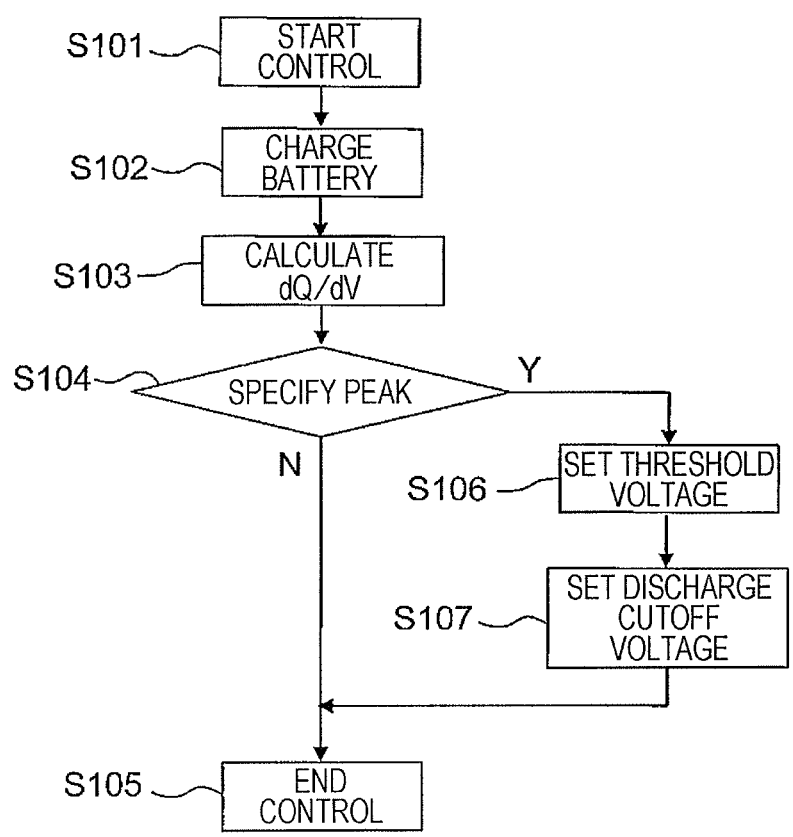
FIG. 5 is a flow diagram illustrating an operation of the battery module illustrated in FIG. 1.
Figure 6:
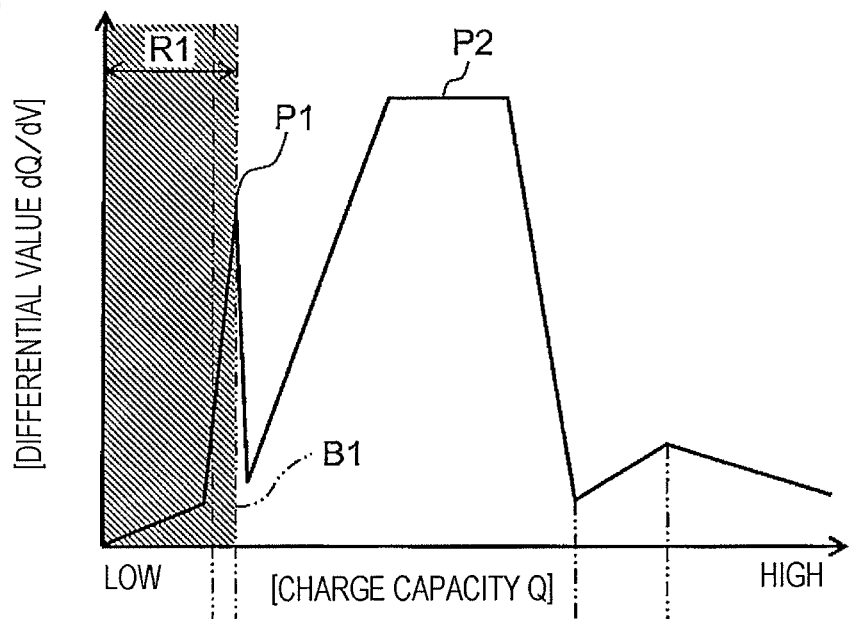
FIGS. 6(a) and 6(b) are graphs illustrating a second embodiment and corresponding to FIGS. 2(a) and 2(b) and FIG. 6(a) is a graph in which a horizontal axis shows a capacity Q and a vertical axis shows a differential value dQ/dV and FIG. 6(b) is a graph in which a horizontal axis shows a capacity Q and a vertical axis shows a voltage V.
Figure 6:
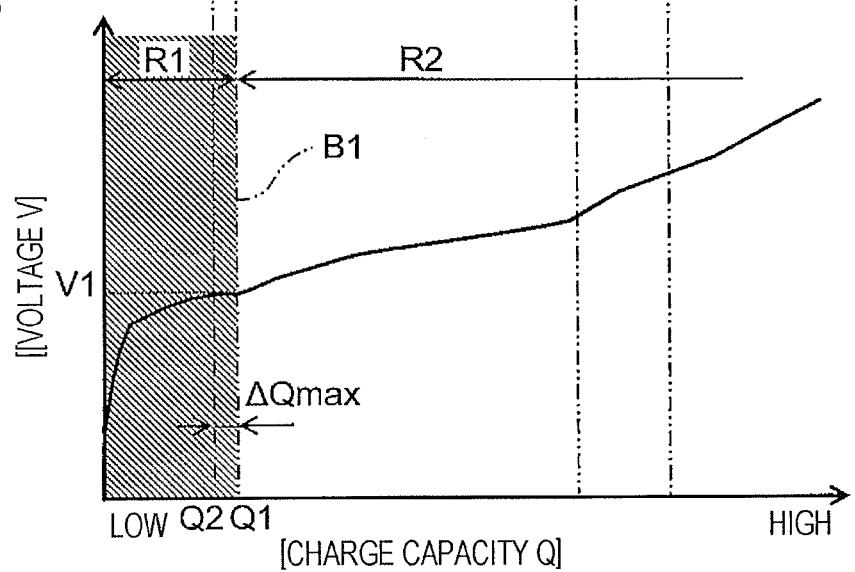

FIG. 5 is a flow diagram illustrating an operation of the battery module 100 according to this embodiment illustrated in FIG. 1.

In step S101 illustrated in FIG. 5, the battery module 100 determines whether control based on the differential value dQ/dV starts, by the control circuit 300. Specifically, it is determined whether the control based on the differential value dQ/dV starts by referring to the measurement result of the measurement unit 310 held in the storage unit 350 via the input/output unit, by the operation unit 320. If the control start based on the differential value dQ/dV is determined, the operation unit 320 sends a command of the control start based on the differential value dQ/dV to the charge/discharge control unit 360 and the process proceeds to step S102.

Determination standards when the operation unit 320 determines the start of the control based on the differential value dQ/dV are as follows. For example, there are the case in which a voltage of the battery 200 has reached the charge cutoff voltage over the predetermined number of times, the case in which the voltage of the battery 200 has reached the discharge cutoff voltage over the predetermined number of times, the case in which integration of a charge/discharge time in the battery 200 has reached a predetermined time, the case in which integration of a charge/discharge capacity of the battery 200 has reached a predetermined capacity, and the case in which the external load 500 has consumed a predetermined amount of power.

When the determination standards are determined, the determination standards are preferably determined in consideration of a design life of the battery 200, materials of the positive electrode 201 and the negative electrode 203, and a use of the battery 200. When a time interval from the start of a use of the battery 200 to the control start based on the differential value dQ/dV is long, the degradation of the battery 200 may be advanced and an effect of suppressing the degradation may decrease. Meanwhile, when the time interval from the start of a use of the battery 200 to the control start based on the differential value dQ/dV is short, the malfunction of the battery module 100 may occur.

In addition, a low state of charge (SOC) of the battery 200 is preferably set as a start condition of the control based on the differential value dQ/dV. This is because, when the SOC is high, it is difficult to measure the peak P1 of the differential value dQ/dV illustrated in FIG. 2(a) and an error is caused. In this case, to reduce the SOC, control to discharge the battery 200 may be executed before the control based on the differential value dQ/dV starts.

In step S102, the charge/discharge control unit 360 that has received the command of the control start based on the differential value dQ/dV from the operation unit 320 starts the charge of the battery 200. For example, the charge/discharge control unit 360 opens the switch S1 of the external load 500 via the input/output unit 370, closes the switch S2 of the power supply 400 for the charge, electrically connects the power supply 400 for the charge and the battery 200 to each other, and charges the battery 200. The charge/discharge control unit 360 refers to the measurement result of the measurement unit 310 held in the storage unit 350 via the input/output unit 370 and the process proceeds to step S103, when the voltage of the battery 200 reaches the predetermined charge cutoff voltage.

In step S103, the operation unit 320 calculates the capacity Q of the battery 200 and calculates the differential value dQ/dV by differentiating the capacity Q with the voltage V, as described above, and the process proceeds to step S104.

In step S104, the threshold voltage setting unit 330 specifies the inflection point of the discharge side generated in the differential value dQ/dV, that is, the peak P1, on the basis of the graph illustrated in FIG. 2(a).

When the use of the battery 200 starts in a range of the region R2 closer to the high capacity side than the region R1 of the low capacity side illustrated in FIG. 2(b), the peak P1 is not detected until a curve of the graph is shifted to the high capacity side by the degradation of the battery 200. As such, when the peak P1 does not exist and the peak P1 cannot be specified by the threshold voltage setting unit 330 (N), the process proceeds to step S105. In step 105, the charge/discharge control unit 360 maintains current setting of the discharge cutoff voltage and ends the control based on the differential value dQ/dV of the battery 200.

Meanwhile, as illustrated in FIGS. 4(a) and 4(b), if the position of the peak P1 of the graph is shifted to the high capacity side by the degradation of the battery 200, the peak P1 appears in a range of the region R2 of the charge capacity Q used by the battery 200. As such, when the peak P1 exists in the use range of the charge capacity Q of the battery 200 and the peak P1 is specified by the threshold voltage setting unit 330 (Y), the process proceeds to step S106.

In step S106, the threshold voltage setting unit 330 sets the voltage V1 at the specified peak P1 to the threshold voltage as described above and the process proceeds to step S107.

In step S107, the cutoff voltage setting unit 340 sets the discharge cutoff voltage of the battery 200 based on the threshold voltage V1. In this embodiment, the cutoff voltage setting unit 340 sets the discharge cutoff voltage of the battery 200 to a voltage equal to or higher than the threshold voltage V1 and the process proceeds to step S105. In step S105, the charge/discharge control unit 360 ends the control based on the differential value dQ/dV of the battery 200.

As described above, the control circuit 300 executes the control based on the differential value dQ/dV with respect to the battery 200, so that the discharge cutoff voltage of the secondary battery 200 can be reset to the voltage V2 corresponding to the peak P1 of the differential value dQ/dV, even when the peak P1 is shifted to the high capacity side by the degradation of the battery 200, as illustrated in FIG. 4(b). As a result, in the region R3 closer to the low capacity side than the peak P1 where the battery 200 is easy to be degraded, the battery 200 can be set not to be used. As such, according to the battery module 100 according to this embodiment, the discharge cutoff voltage of the battery 200 is sequentially set to the optimal voltage V2 based on the differential value dQ/dV by the control circuit 300 and the battery 200 can be used in a range of the discharge capacity Q in which the battery 200 is hard to be degraded at all times.

As described above, according to the battery module 100 according to this embodiment, the peak P1 of the low capacity side generated in the differential value dQ/dV is specified, the voltage V2 at the peak P1 is set to the threshold voltage, and the discharge cutoff voltage of the battery 200 is set on the basis of the threshold voltage V2, so that a cycle characteristic of the battery 200 can be improved.

As a method of increasing the discharge cutoff voltage, a different method can be used under a charge/discharge condition where it can be anticipated that the discharge cutoff voltage increases substantially. Specifically, there is a method of shifting a relation of the SOC and the voltage to the discharge side wholly to decrease a limit discharge capacity. Setting is preferably performed in consideration of the design life of the battery, the materials of the positive and negative electrodes, and the use of the battery. By previously examining a battery life at the time of changing a charge/discharge condition, a charge/discharge condition where an influence on the use of the battery or malfunction is small and an effect is large is preferably set.

<Battery Pack>

A battery pack can be configured by connecting a plurality of batteries 200 in series or in parallel, in the battery module 100 described above. In this case, a cell controller is preferably provided in each battery 200. A configuration in which the cell controller is an electronic circuit device to manage a state of each battery 200 and an integrated circuit element for cell management provided to correspond to each battery 200, a circuit element to change a power storage state of each battery 200, a circuit to detect the voltage of each battery 200, an insulating element such as a photocoupler, a circuit element configuring a noise removing circuit, and a circuit element configuring a protection circuit are mounted on a circuit board is exemplified. According to the battery pack having the above configuration, the same effect as the battery module 100 can be obtained.

In the battery pack in which the plurality of batteries 200 are connected in parallel, a variable resistor is provided and an effect of suppressing a degradation variation of each battery 200 in the battery pack by decreasing a current value of the side of the battery 200 in which the discharge cutoff voltage has been corrected can be anticipated. In addition, in the battery pack in which the plurality of batteries 200 are connected in series, an effect of suppressing a degradation variation of each battery 200 by increasing the charge voltage of the battery 200 in which the correction has been performed can be anticipated.

Second Embodiment

Next, a second embodiment of the battery module according to the present invention will be described using FIGS. 1 to 7 of the first embodiment.

A battery module 100 according to this embodiment is different from the first embodiment in that a battery 200 is used by only $\Delta Q_{max}$ even in a part of a region R1 closer to the discharge side than the peak P1 illustrated in FIG. 2(a), that is, the low capacity side than the peak P1, as illustrated in FIGS. 6(a) and 6(b). Because the other point is the same, the same portions are denoted with the same reference numerals and description thereof is omitted.

When the battery 200 is used, the battery module 100 according to this embodiment sets a charge capacity Q2 at a boundary of the discharge side of a capacity range enabling suppression of degradation of the battery 200, which is lower than the charge capacity Q1 at the peak P1 of the graph of the differential value dQ/dV and the charge capacity Q illustrated in FIG. 2(a), to a lower limit of the charge capacity Q, that is, a discharge cutoff capacity.

A capacity difference $\Delta Q$ of the charge capacity Q2 to be the lower limit of the charge capacity Q in the battery 200 and the charge capacity Q1 at the peak P1 of the differential value dQ/dV is preferably equal to or smaller than 20% of a capacity $Q_{Si}$ based on a silicon-based active material included in a negative electrode mixture layer of a negative electrode 203 included in the battery 200, for example. That is, the capacity difference $\Delta Q$ and the capacity $Q_{Si}$ of the silicon-based active material preferably satisfy a relation of the following formula (2).

$$\Delta Q \leq \alpha Q_{Si} (\alpha \text{ is a constant satisfying } 0 < \alpha \leq 0.2) \quad (2)$$

In the formula (2), if α is larger than 0.2, necessary suppression of cycle deterioration becomes difficult. The capacity $Q_{Si}$ of the silicon-based active material included in the negative electrode mixture layer of the negative electrode 203 included in the battery 200 can be specified by a mixing rate of the silicon-based active material in a negative electrode active material or a kind of the active material. In the case in which it is difficult to specify the capacity $Q_{Si}$ of the silicon-based active material, when the battery 200 is discharged at a low rate of 1/10 C or less, a discharge capacity when the battery 200 is discharged from the capacity Q1 at the inflection point illustrated in FIG. 2(a), that is, the peak P1 to a discharge cutoff voltage where a potential of the negative electrode 203 becomes 2.0 V may be replaced with $\alpha Q_{Si}$.

α is preferably set according to a use. When a value of α decreases, a life characteristic is improved and when the value increases, a temporary capacity decrease can be reduced. A maximum value $\Delta Q_{max} = \alpha Q_{Si}$ of the capacity difference $\Delta Q$ based on the formula (2) is preferably recorded and held previously in a storage unit 350 of a control circuit 300. In this embodiment, the control circuit 300 includes the storage unit 350 in which the capacity difference ΔQ of the capacity Q1 at a threshold voltage V1 and the capacity at the discharge cutoff voltage is previously recorded.

Figure 7:
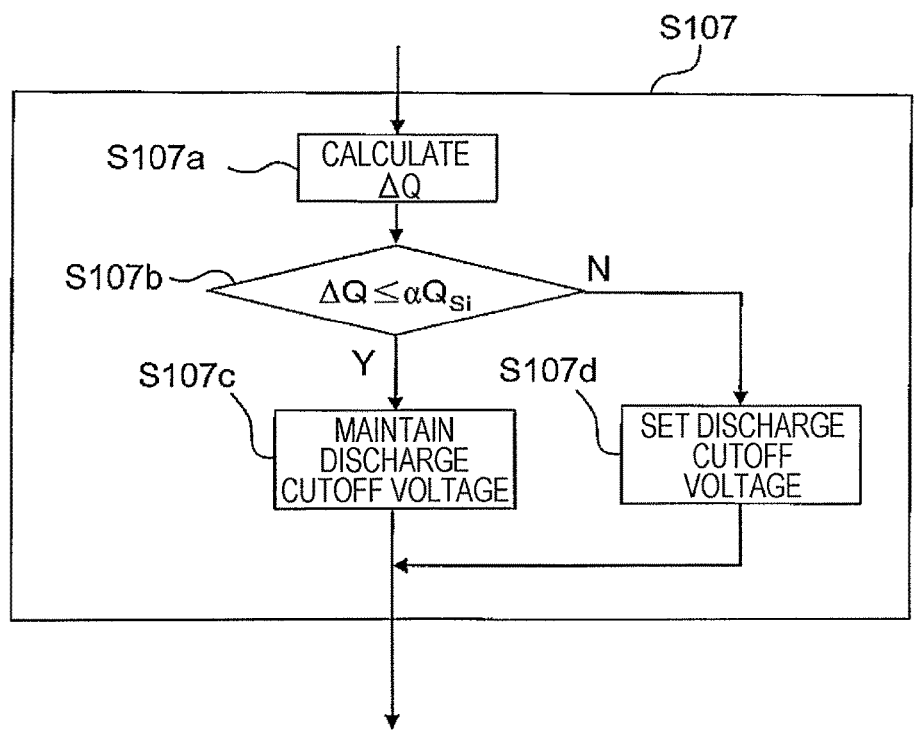
FIG. 7 is a flow diagram illustrating an operation of a battery module according to a second embodiment of the present invention.

Next, an operation of the battery module 100 according to this embodiment will be described. FIG. 7 is a flow diagram illustrating the details of setting of the discharge cutoff voltage in step S107 illustrated in FIG. 5.

The battery module 100 according to this embodiment is different from the first embodiment in that step S107 illustrated in FIG. 5 has steps S107a to S107d illustrated in FIG. 7. Because the other operation is the same as the operation of the battery module 100 according to the first embodiment, description thereof is omitted.

The battery 200 is used during a predetermined period from use start, for example, in the range R2 closer to the discharge side, that is, the high capacity side than the peak P1 of the graph of the differential value dQ/dV and the charge capacity Q illustrated in FIG. 2(a).

In step S107a, an operation unit 320 refers to a measurement result of a measurement unit 310 held in the storage unit 350 via an input/output unit 370 and calculates the capacity difference ΔQ of the capacity Q1 at the threshold voltage V1 and the capacity at the discharge cutoff voltage, on the basis of the measurement result, and the process proceeds to step 107b.

In step S107b, the operation unit 320 refers to the maximum value $\Delta Q_{max} = \alpha Q_{Si}$ of the capacity difference ΔQ held in the storage unit 350 via the input/output unit 370 and determines whether the calculated capacity difference ΔQ is equal to or smaller than the maximum value $\Delta Q_{max}$, that is, satisfies the formula (2).

In step S107b, when the peak P1 is shifted to the high capacity side by degradation of the battery 200, it is assumed that the capacity difference ΔQ obtained by subtracting the discharge cutoff capacity from the capacity of the peak P1 is equal to or smaller than the maximum value $\Delta Q_{max}$ of the capacity difference ΔQ. In this case, the operation unit 320 determines that the capacity difference ΔQ is equal to or smaller than the maximum value $\Delta Q_{max}$ (Y) and the process proceeds to step S107c.

In step S107c, a cutoff voltage setting unit 340 maintains the discharge cutoff voltage of the battery 200 and the process proceeds to step S105.

However, in step S107b, when the capacity difference ΔQ obtained by subtracting the capacity at the discharge cutoff voltage from the capacity of the peak P1 is larger than the maximum value $\Delta Q_{max}$, the operation unit 320 determines that the capacity difference ΔQ is not equal to or smaller than the maximum value $\Delta Q_{max}$ (N) and the process proceeds to step S107d. That is, when the calculated capacity difference ΔQ is larger than the recorded maximum value $\Delta Q_{max} = \alpha Q_{Si}$, the process proceeds to step S107d.

In step S107d, the cutoff voltage setting unit 340 sets the discharge cutoff voltage to a voltage corresponding to the capacity obtained by subtracting the maximum value $\Delta Q_{max}$ from the capacity Q1 at the threshold voltage V1 and the process proceeds to step S105.

According to the battery module 100 and the battery pack including the battery module 100 according to this embodiment, the battery 200 can be used even in a part of the region R1 closer to the discharge side than the peak P1 illustrated in FIG. 2(a), that is, the low capacity side than the peak P1. Therefore, the same effect as the battery module 100 and the battery pack according to the first embodiment can be obtained and an influence of a temporary capacity decrease by increasing the discharge cutoff voltage of the battery 200 can be minimized.

[Power Supply Device]

Figure 8:
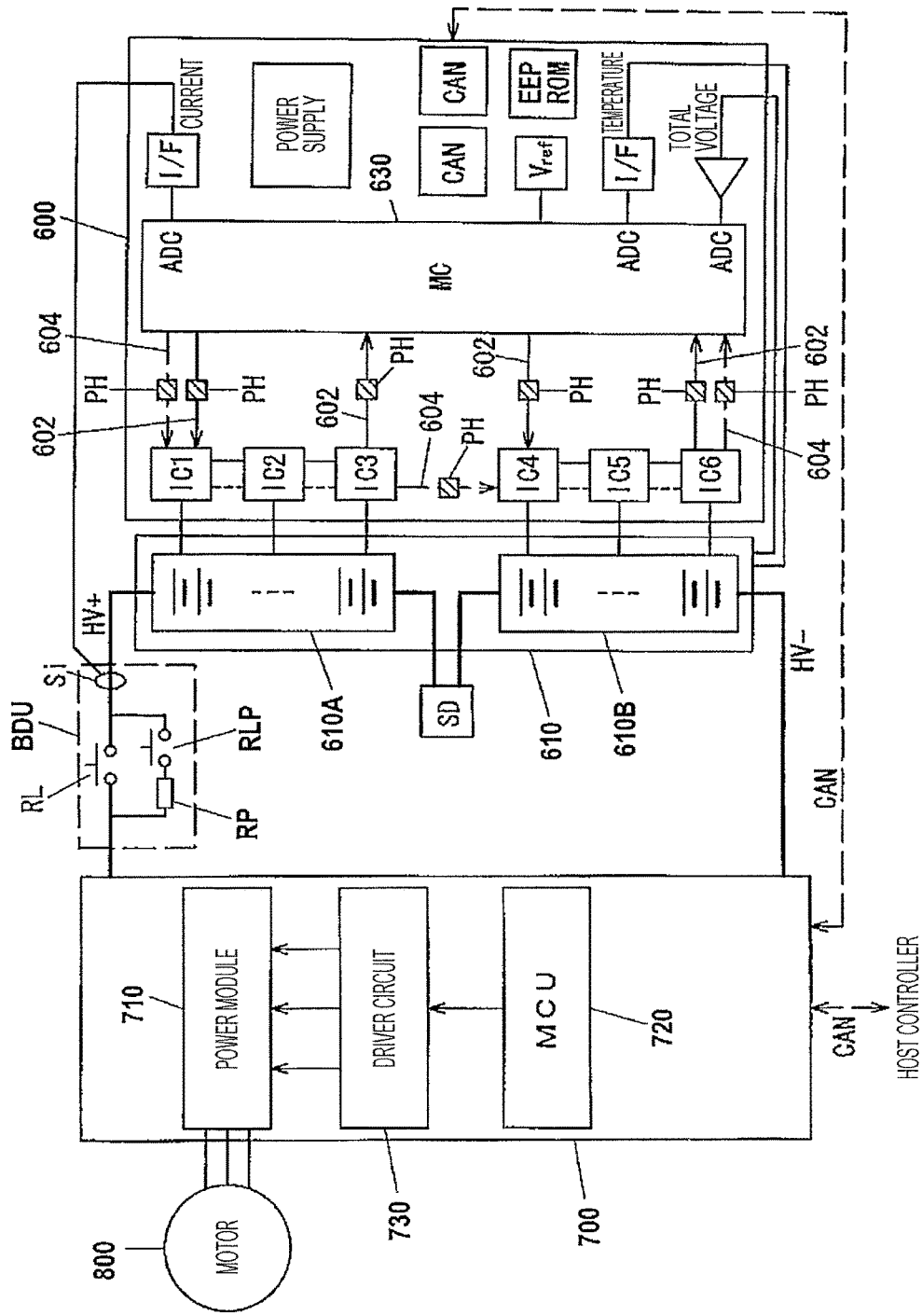
FIG. 8 is a diagram illustrating an example of a power supply device to which the battery module illustrated in FIG. 1 is applied.

Hereinafter, a power supply device to which the battery module 100 according to the embodiments can be applied will be described. FIG. 8 is a diagram illustrating an example of the power supply device and a block diagram illustrating a drive system of a hybrid vehicle.

The drive system includes a battery pack 610 including the battery module 100 described in the embodiments, a battery monitoring device 600 monitoring the battery pack 610, an inverter device 700 converting direct-current power from the battery pack 610 into three-phase alternating-current power, and a motor 800 for vehicle drive. The motor 800 is driven by the three-phase alternating-current power from the inverter device 700. The inverter device 700 and the battery monitoring device 600 are coupled by CAN communication and the inverter device 700 functions as a host controller for the battery monitoring device 600. In addition, the inverter device 700 operates on the basis of command information from the host controller (not illustrated in the drawings).

The inverter device 700 has a power module 710, an MCU 720, and a driver circuit 730 to drive the power module 710. The power module 710 converts the direct-current power supplied from the battery pack 610 into the three-phase alternating-current power to drive the motor 800. Although not illustrated in the drawings, a smoothing capacitor having a large capacity of about 700 μF to 2000 μF is provided between strong electricity lines HV+ and HV− connected to the power module 710. The smoothing capacitor reduces a voltage noise that is applied to an integrated circuit provided in the battery monitoring device 600.

In a state in which an operation of the inverter device 700 starts, a load of the smoothing capacitor is approximately zero and when a relay RL is closed, a large initial current flows to the smoothing capacitor. Due to the large current, the relay RL may be fused and damaged. To resolve such a problem, the MCU 720 changes a state of a precharge relay RLP from an open state to a closed state and charges the smoothing capacitor, when drive of the motor 800 starts, according to a command from the host controller. Then, the MCU 720 changes a state of the relay RL from an open state to a closed state and starts to supply power from the battery pack 610 to the inverter device 700. When the smoothing capacitor is charged, charge is performed while a maximum current is limited by a resistor RPRE. By executing this operation, a relay circuit can be protected, the maximum current flowing through a battery cell or the inverter device 700 can be reduced to a predetermined value or less, and high safety can be maintained.

The inverter device 700 controls a phase of alternating-current power generated by the power module 710 with respect to a rotor of the motor 800 and operates the motor 800 as a generator, when a vehicle is braked. That is, regenerative braking control is executed, power generated by operating the generator is used to charge the battery pack 610. When an SOC of the battery pack 610 is lower than a reference state, the inverter device 700 operates the motor 800 as a generator. The three-phase alternating-current power generated by the motor 800 is converted into direct-current power by the power module 710 and is supplied to the battery pack 610. As a result, the battery pack 610 is charged.

Meanwhile, when the motor 800 performs power running, according to a command from the host controller, the MCU 720 controls the driver circuit 730 to generate a rotation magnetic field of an advancement direction with respect to rotation of the rotor of the motor 800 and controls a switching operation of the power module 710. In this case, the direct-current power is supplied from the battery pack 610 to the power module 710. In addition, when the battery pack 610 is charged by the regenerative braking control, the MCU 720 controls the driver circuit 730 to generate a rotation magnetic field of a delay direction with respect to the rotation of the rotor of the motor 800 and controls the switching operation of the power module 710. In this case, the power is supplied from the motor 800 to the power module 710 and the direct-current power of the power module 710 is supplied to the battery pack 610. As a result, the motor 800 functions as the generator.

The power module 710 of the inverter device 700 executes a conducting operation and a shutdown operation at a high speed and executes power conversion between the direct-current power and the alternating-current power. At this time, because the large current is interrupted at a high speed, a large voltage variation is generated by inductance of a direct-current circuit. The smoothing capacitor having the large capacity is provided to suppress the voltage variation.

The battery pack 610 includes two battery blocks 610A and 610B that are connected in series. Each of the battery blocks 610A and 610B includes battery cells of 16 cells that are connected in series. The battery block 610A and the battery block 610B are connected in series via a service disconnect SD for maintenance and check in which a switch and a fuse are connected in series. The service disconnect SD is opened, so that a series circuit of an electric circuit is cut off, and a current does not flow even if one connection circuit with a vehicle is formed at any point of the battery blocks 610A and 610B. By this configuration, high safety can be maintained. By this configuration, high safety can be maintained. Even though a person contacts a portion between HV+ and HV− at the time of the check, the person is safe because a high voltage is not applied to a human body.

A battery disconnect unit BDU including the relay RL, the resistor RP, and the precharge relay RLP is provided in the strong electricity line HV+ between the battery pack 610 and the inverter device 700. A series circuit of the resistor RP and the precharge relay RLP is connected in parallel to the relay RL.

The battery monitoring device 600 performs measurement of each cell voltage, measurement of a total voltage, measurement of a current, and adjustment of a cell temperature and a cell capacity. For this reason, integrated circuits IC1 to IC6 functioning as cell controllers are provided. The battery cells of the 16 cells provided in each of the battery blocks 610A and 610B are divided into three cell groups and one integrated circuit is provided for each cell group. The cell controller has a function of managing each cell and performs monitoring of a cell voltage, detection of overcharge/overdischarge, and equalization of a voltage between cells. The charge/discharge control unit 360, the voltage detection element 311, and the current detection element 321 illustrated in FIG. 1 are provided in the cell controller.

IC1 to IC6 include a communication system 602 and a one-bit communication system 604. In the communication system 602 to read a cell voltage value or transmit various commands, serial communication with a microcomputer 630 is performed via an insulating element (for example, a photocoupler) PH in a daisy chain mode. The one-bit communication system 604 transmits an abnormal signal when the overcharge of the cell is detected. In the example illustrated in FIG. 1, the communication system 602 is divided into an upper communication path with respect to IC1 to IC3 of the battery controller 610A and a lower communication path with respect to IC4 to IC6 of the battery block 610B.

The microcomputer 630 has a function as a host controller of the cell controllers (IC1 to IC6) and performs monitoring (monitoring of a total voltage, monitoring of a current, monitoring of a temperature, and acquisition of information from the cell controllers) of the battery pack 610, control (relay control) of an external circuit, detection of battery states (SOC operation, degradation state, and permissible charge/discharge current operation), and various diagnoses (overcharge protection, overdischarge protection, electric leakage detection, and failure detection).

A current sensor Si such as a Hall element is disposed in the battery disconnect unit BDU and an output of the current sensor Si is input to the microcomputer 630. Signals regarding the total voltage and the temperature of the battery pack 610 are also input to the microcomputer 630 and are measured by an AD converter (ADC) of the microcomputer 630. Temperature sensors are provided in a plurality of places in the battery blocks 610A and 610B.

The measurement unit 310, the operation unit 320, the threshold voltage setting unit 330, the cutoff voltage setting unit 340, the storage unit 350, and the input/output unit 370 illustrated in FIG. 1 are provided in the battery monitoring device 600 and the control of the charge/discharge of the battery 200 based on the differential value dQ/dV, which has been described in the embodiments, is executed by the battery monitoring device 600. The discharge cutoff voltage can be changed using a method such as the SOC operation change and the overdischarge protection.

In the embodiments described above, the lithium ion secondary battery for the vehicle mounting is described as the example. However, the present invention is not limited to the lithium ion secondary battery for the vehicle mounting and can be applied to a lithium ion secondary battery module of a lithium ion secondary battery used for storing power generated by photovoltaic power generation or wind power generation and supplying the power to a power system.

[Vehicle]

Figure 9:
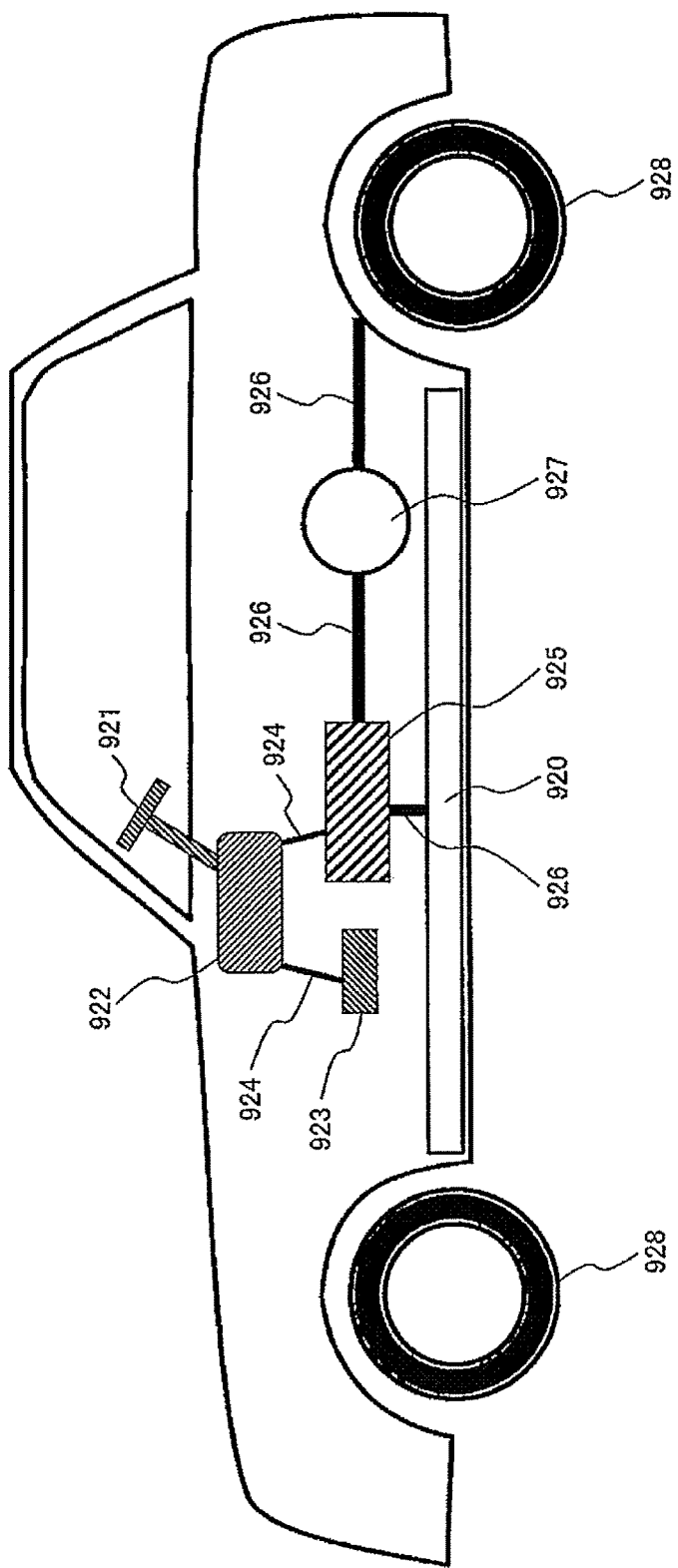
FIG. 9 is a diagram illustrating a schematic configuration of a vehicle to which the battery module illustrated in FIG. 1 is applied.

Next, an example of a vehicle including the battery module 100 and the battery pack according to the embodiments will be described. FIG. 9 is a diagram illustrating a schematic configuration of a plug-in hybrid vehicle.

12 sets of battery blocks having the same specification as the battery blocks 610A and 610B described in the example of the power supply device are manufactured, the battery blocks are connected in series, and a battery 920 is manufactured. In addition, a drive system having the same configuration as the plug-in hybrid vehicle is manufactured using the battery 920, a steering wheel 921, a control device 922, an accelerator 923, a signal cable 924, a converter 925, and a power cable 926. A motor 927 and wheels 928 of the plug-in hybrid vehicle are replaced with a charge/discharge device. The charge/discharge device corresponds to the external load 500 and the power supply 400 for the charge illustrated in FIG. 1 and consumes power from the battery module 100 and supplies regenerative energy to the battery module 100. In addition, the control device 922 has the control circuit 300 illustrated in FIG. 1.

The same operating test as when the battery 920 is mounted on the plug-in hybrid vehicle is executed using the drive system. The battery 920 can be disposed on a bottom portion of a vehicle body of the plug-in hybrid vehicle.

When a driver operates the steering wheel 921 or steps on the accelerator 923, the control device 922 transmits a signal to the converter 925 via the signal cable 924. The converter 925 executes an operation process of the signal transmitted from the control device 922, increases/decreases an output from the battery 920, controls a consumption power amount of the motor 927 via the power cable 926, and performs acceleration or braking of the wheels 928. At the time of the acceleration, electric energy stored in the battery 920 can be consumed and at the time of the braking, the electric energy can be taken (so-called regeneration is performed).

Figure 10:
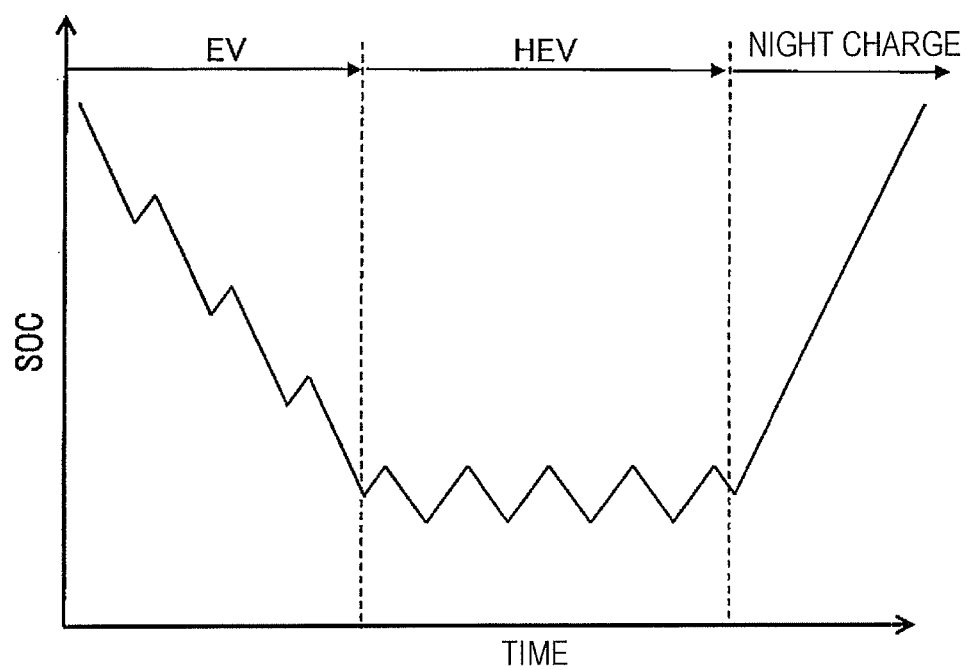
FIG. 10 is a diagram illustrating a change of a state of charge of the battery module included in the vehicle illustrated in FIG. 8.

FIG. 10 illustrates a change of a state of charge of the battery module 100 during traveling and at the time of night charge, over time. When an SOC of the battery 200 is equal to or larger than a constant SOC, the vehicle travels in an EV mode in which a use ratio of the battery is large and fuel efficiency is good. In a step in which the SOC reaches the constant SOC, the vehicle travels in an HEV mode in which the SOC is constant in a certain range and the charge and discharge are repeated. In a step in which the traveling is stopped, the night charge is performed with external power.

In the flow illustrated in FIG. 5, the control start of step S101 can be replaced with night charge start. At this time, when the inflection point, that is, the peak P1 exists in dQ/dV of the charge curve, a mode is switched into the HEV mode and the SOC is changed to a region where the peak P1 does not exist.

According to the plug-in hybrid vehicle according to this embodiment, even though the battery 200 is used during a long period, a decrease rate of a capacity to be rechargeable can be suppressed low. Because the capacity of the battery 200 of the battery module 100 can be maintained high over the long period, a characteristic of a long life of the manufactured battery 920 can be stably obtained. Here, the example of the application to the plug-in hybrid vehicle has been described. However, the present invention is not limited thereto and can be applied to a stationary power storage system for power storage. Even in this case, the capacity of the battery 200 can be maintained high over the long period and the characteristic of the long life can be stably obtained even in an environment of a high temperature.

The embodiments of the present invention have been described in detail using the drawings. However, a specific configuration is not limited to the embodiments and a design change performed without departing from the scope of the present invention is included in the present invention.

Hereinafter, examples of the battery module according to the present invention based on the embodiments will be described.

Example 1

A lithium ion secondary battery having the same configuration as the battery 200 described in the first embodiment and illustrated in FIG. 3 is manufactured. At this time, $LiNi_{1/3}Mn_{1/3}Co_{1/3}O_2$ is used as a positive electrode active material. Negative electrode active materials including SiO to be a silicon-based active material and natural graphite (graphite interlayer distance ($d_{002}$) by X-ray structure analysis=0.336 nm) are used. In addition, aluminum foil is used as a positive electrode and copper foil is used as a negative electrode. A mixture ratio of the silicon-based active material is set to 2 wt %.

First, the positive electrode is manufactured. $LiNi_{1/3}Mn_{1/3}Co_{1/3}O_2$ to be the positive electrode active material is added to an 86.0 weight part, powdered carbon and acetylene black to be conductive agents are added to a 6.0 weight part and a 2.0 weight part, respectively, a solution obtained by previously dissolving PVDF of a 6.0 weight part to be a binder in NMP is added, these are mixed with a planetary mixer, and positive electrode mixture slurry is prepared. The slurry is applied uniformly to both surfaces of a current collector made of aluminum foil of a thickness of 20 μm, using an applicator. After the application, the resultant is compressed and formed by a roll press machine and the positive electrode is obtained.

Next, the negative electrode is manufactured. The silicon-based active material and the graphite to be the negative electrode active materials are added to a 5 weight part and a 95 weight part at a mixture ratio by an amount corresponding to a 1.5 weight part of a solid content of a 1% aqueous solution of carboxymethyl cellulose (CMC) and an amount corresponding to a 1.5 weight part of a solid content of a 40% aqueous solution of SBR, these are mixed with the planetary mixer, and negative electrode mixture slurry is prepared. The slurry is applied uniformly to both surfaces of a current collector made of rolled copper foil of a thickness of 10 μm, using the applicator. After the application, the resultant is compressed and formed by the roll press machine and the negative electrode is obtained.

In addition, the positive electrode and the negative electrode are cut into desired sizes and current collection tabs are welded to non-application parts of the mixture layer using ultrasonic waves. In the positive electrode, a lead piece of aluminum is used as the current collection tab, and in the negative electrode, a lead piece of nickel is used as the current collection tab. Then, a separator made of a porous polyethylene film and having a thickness of 30 μm is wound while being interposed by the positive electrode and the negative electrode. A wound body is inserted into a battery can, a negative electrode tab is connected to a can bottom of the battery can by resistance welding, and a positive lid is connected to a positive electrode tab by ultrasonic welding. Next, an electrolyte solution by dissolving $LiPF_6$ of 1 mol/l in a mixed solvent of ethylene carbonate (EC), dimethyl carbonate (DMC), and diethyl carbonate (DEC)=1:1:1 at a volume ratio and adding vinylene carbonate and fluoroethylene carbonate as additive agents by 1 wt % is injected. Then, the positive lid is sealed to the battery can by swaging and a desired lithium ion secondary battery is obtained.

The battery module 100 described in the first and second embodiments is manufactured using the manufactured lithium ion secondary battery, the control based on the differential value dQ/dV according to the second embodiment illustrated in FIGS. 5 and 7 is executed by the following method, and a battery characteristic is evaluated.

The manufactured battery is charged to 4.20 V with a current corresponding to 0.3 CA at an approximately normal temperature (25° C.) and constant voltage charge is then performed until a current becomes 0.03 C at 4.20 V. After stop for 30 minutes, constant current discharge is performed to 3.0 V with a constant current corresponding to 0.3 CA. This is performed for four cycles, initialization is performed, a battery capacity of the fourth cycle is measured, and the measured battery capacity is set as an initial battery capacity. The initial battery capacity is 1.15 Ah.

Next, 1000 charge/discharge cycles are carried out at 25° C. At each cycle, the charge is performed to 4.20 V with a current corresponding to 0.3 C and the constant voltage charge is then performed until the current becomes 0.03 C at 4.20 V. The discharge is performed to 3.55 V corresponding to SOC 20% with constant power of 8 W. There is a stop time of 15 minutes between the charge and the discharge.

The position check of the inflection point, that is, the control based on the differential value dQ/dV starts from a 50-th cycle and is executed according to the flowchart illustrated in FIG. 5 for every five cycles thereafter. In this case, a of the formula (2) is 0. A changed charge/discharge condition is realized by a method of decreasing a discharge voltage by 0.03 V. Then, the charge is performed to 4.20 V with a considerable current after leaving for 12 hours at 25° C. Then, the constant voltage charge is performed until the current becomes 0.03 CA at 4.20 V. After stop for 30 minutes, the constant current discharge is performed to 3.0 V with a constant current corresponding to 0.3 CA, the battery capacity after 1000 cycles is measured, and 0.966 Ah is obtained. In addition, an integration discharge capacity in the cycles is 828000 Ah.

Using the result obtained as described above, a battery capacity maintenance rate is calculated by the following formula (3). A result thereof is illustrated in Table 1.

Battery capacity maintenance rate (%)=(battery capacity after 500 cycles)/(initial battery capacity)  (3)

except that a mixing rate of SiO of a negative electrode active material and α of the formula (2) are changed. When mixing is performed with Si mixing rates of 30 wt % and 65 wt %, the discharge SOC at the cycle is appropriately increased to 40% and 55%, according to a position of the inflection point of the graph of the differential value dQ/dV and the charge capacity Q illustrated in FIGS. 2(a) and 4(a), that is, the peak P1.

In Examples 1 to 12, in a range in which a is equal to or smaller than 0.2, the inflection point check, that is, the control based on the differential value dQ/dV is executed and the charge/discharge condition is changed. In Comparative examples 1 to 12, the control is not executed or the charge/discharge condition is changed when a has a value larger than 0.2. As shown in Table 1, in Examples 1 to 12, a capacity maintenance rate after 1000 cycles is 65% or more and a 1000 cycle integration discharge capacity becomes a relatively large value of 500000 Ah or more. Meanwhile, in Comparative examples 1 to 12, the capacity maintenance rate after the 1000 cycles is lower than 65%

TABLE 1

|  | Control based on dQ/dV | SiO mixing rate | α | Initial battery capacity (Ah) | Capacity maintenance rate after 1000 cycles (%) | 1000 cycle integration discharge capacity (Ah) |
| --- | --- | --- | --- | --- | --- | --- |
| Example 1 | Presence | 2.0 | 0 | 1.15 | 84 | 828000 |
| Example 2 | Presence | 2.0 | 0.1 | 1.15 | 83 | 834000 |
| Example 3 | Presence | 2.0 | 0.2 | 1.15 | 82 | 835000 |
| Example 4 | Presence | 10.0 | 0 | 1.22 | 76 | 829600 |
| Example 5 | Presence | 10.0 | 0.1 | 1.22 | 75 | 831000 |
| Example 6 | Presence | 10.0 | 0.2 | 1.22 | 74 | 832000 |
| Example 7 | Presence | 30.0 | 0 | 1.27 | 68 | 712800 |
| Example 8 | Presence | 30.0 | 0.1 | 1.27 | 69 | 715500 |
| Example 9 | Presence | 30.0 | 0.2 | 1.27 | 70 | 718700 |
| Example 10 | Presence | 65.0 | 0 | 1.34 | 77 | 514720 |
| Example 11 | Presence | 65.0 | 0.1 | 1.34 | 76 | 518500 |
| Example 12 | Presence | 65.0 | 0.2 | 1.34 | 74 | 521000 |
| Comparative example 1 | Absence | 2.0 | — | 1.15 | 58 | 690000 |
| Comparative example 2 | Presence | 2.0 | 0.4 | 1.15 | 62 | 691000 |
| Comparative example 3 | Presence (inactivation) | 2.0 | 0.7 | 1.15 | 58 | 687000 |
| Comparative example 4 | Absence | 10.0 | — | 1.22 | 45 | 683200 |
| Comparative example 5 | Presence | 10.0 | 0.4 | 1.22 | 53 | 653200 |
| Comparative example 6 | Presence | 10.0 | 0.7 | 1.22 | 50 | 663200 |
| Comparative example 7 | Absence | 30.0 | — | 1.27 | 55 | 519760 |
| Comparative example 8 | Presence | 30.0 | 0.4 | 1.27 | 56 | 508760 |
| Comparative example 9 | Presence | 30.0 | 0.7 | 1.27 | 57 | 512000 |
| Comparative example 10 | Absence | 65.0 | — | 1.34 | 52 | 454800 |
| Comparative example 11 | Presence | 65.0 | 0.4 | 1.34 | 53 | 445600 |
| Comparative example 12 | Presence | 65.0 | 0.7 | 1.34 | 54 | 458700 |
| Comparative example 13 | Presence | 75.0 | 0 | 1.36 | 87 | 158700 |

Examples 2 to 12 and Comparative Examples 1 to 13

In Examples 2 to 12 and Comparative examples 1 to 13 shown in Table 1, a battery capacity maintenance rate is calculated by the same method as the first embodiment, and the 1000 cycle integration discharge capacity decreases as compared with Examples. In addition, in Comparative example 13, even though the control based on the differential value dQ/dV is executed, improvement is not made and the integration discharge capacity decreases due to malfunction.

As described above, a lithium ion secondary battery module in which a decrease of a battery capacity of a lithium ion secondary battery can be suppressed even after the charge/discharge of the 1000 cycles by Examples 1 to 12 and a cycle characteristic can be improved can be provided.

REFERENCE SIGNS LIST 100 battery module
200 battery (lithium ion secondary battery)
203 negative electrode
300 control circuit
310 measurement unit
320 operation unit
330 threshold voltage setting unit
340 cutoff voltage setting unit
350 storage unit
360 charge/discharge control unit
610 battery pack
P1 peak
$\Delta Q_{max}$ maximum value of capacity difference
V1 voltage corresponding to P1 of initial voltage
V2 voltage corresponding to P1 after degradation

The invention claimed is:

1. A battery module, comprising:
    a lithium ion secondary battery which has a negative electrode mixture layer including a silicon-based active material and graphite on a surface of a negative electrode; and
    a control circuit which controls charge/discharge of the lithium ion secondary battery,
    wherein the control circuit includes
    a measurement unit which measures a voltage, a current, and a time of the charge/discharge of the lithium ion secondary battery,
    an operation unit which calculates a capacity Q of the lithium ion secondary battery on the basis of the voltage, the current, and the time and calculates a differential value dQ/dV by differentiating the capacity Q with the voltage V,
    a threshold voltage setting unit which specifies a peak of a low capacity side of the differential value dQ/dV generated on the basis of a stage structure of the graphite and sets a voltage at the peak to a threshold voltage,
    a cutoff voltage setting unit which sets a discharge cutoff voltage of the lithium ion secondary battery on the basis of the threshold voltage, and
    a charge/discharge control unit which controls the charge/discharge of the lithium ion secondary battery on the basis of the discharge cutoff voltage.

2. The battery module according to claim 1, wherein
    the control circuit includes a storage unit in which a maximum value of a capacity difference of the capacity at the threshold voltage and the capacity at the discharge cutoff voltage is previously recorded,
    the operation unit calculates the capacity difference on the basis of a measurement result of the measurement unit, and
    the cutoff voltage setting unit sets the discharge cutoff voltage to a voltage corresponding to a capacity obtained by subtracting the maximum value from the capacity at the threshold voltage, when the calculated capacity difference is larger than the recorded maximum value.

3. The battery module according to claim 2, wherein the maximum value is equal to or smaller than 20% of a capacity based on the silicon-based active material.

4. The battery module according to claim 3, wherein the silicon-based active material is silicon oxide and when a sum of mass of the silicon oxide and the graphite included in the negative electrode mixture layer is set to 100 wt %, the negative electrode mixture layer includes the silicon oxide at a ratio of 2 wt % to 65 wt %.

5. The battery module according to claim 4, wherein the negative electrode mixture layer includes the silicon oxide at a ratio of 10 wt % or less.

6. A battery pack, comprising:
    the battery module according to any one of claims 1 to 5; and
    a plurality of lithium ion secondary batteries.

7. The battery pack according to claim 1, further comprising:
    cell controllers each of which controls each of the lithium ion secondary batteries,
    wherein the charge/discharge control unit is provided in each of the cell controllers.

* * * * *